United States Patent [19]

Chamberlin

[11] 4,309,571
[45] Jan. 5, 1982

[54] TELEPHONE-ADAPTER APPARATUS FOR A DICTATION UNIT

[75] Inventor: David B. Chamberlin, Milford, Conn.

[73] Assignee: Dictaphone Corporation, Rye, N.Y.

[21] Appl. No.: 146,779

[22] Filed: May 5, 1980

[51] Int. Cl.³ .......................................... H04M 11/10
[52] U.S. Cl. ................................. 179/6.09; 179/6.14; 179/6.15; 360/74.1; 369/25
[58] Field of Search ... 179/100.1 DR, 6 R, 100.1 VC, 179/6.09, 6.03, 6.07, 6.01, 6.14, 6.15; 360/60, 74.1, 137, 74.4; 369/25, 50

[56] References Cited

U.S. PATENT DOCUMENTS

| | | | |
|---|---|---|---|
| 3,467,781 | 9/1969 | Feat | 179/6 R |
| 3,499,993 | 3/1970 | Owen | 179/6 R |
| 3,508,004 | 4/1970 | Waldman | 179/6 E |
| 3,842,213 | 10/1974 | Foresta | 179/100.1 VC |
| 3,845,248 | 10/1974 | Ando | 179/100.1 DR |
| 3,943,292 | 3/1976 | Takazawa | 179/6 R |
| 4,037,053 | 7/1977 | Mueller | 179/6 R |
| 4,092,680 | 5/1978 | Sander | 179/100.1 DR |
| 4,198,544 | 4/1980 | Buglewicz | 179/6 R |

*Primary Examiner*—Alan Faber
*Attorney, Agent, or Firm*—Curtis, Morris & Safford

[57] ABSTRACT

Apparatus is provided for operating a dictation unit as a telephone-answering device. The dictation unit has a movable record medium upon which an announce message is recorded at a predetermined portion. Switching circuitry is selectively operable to condition the dictation unit to operate as a telephone-answering device, and a line coupler connects the dictation unit to a telephone line. An activate arrangement is operable when the dictation unit is conditioned to operate as a telephone-answering device to respond to an incoming ringing signal on the telephone line for activating the movable record medium to advance at a playback speed so as to transmit the announce message over the telephone line and, at the conclusion of the announce message, to advance to the next available recording portion thereon to record an incoming message. In a preferred embodiment, the dictation unit is operable either as a telephone-answering device or as a remote dictation machine wherein the record medium is advanced at a recording speed to record an incoming message thereon in response to an incoming telephone call. In the telephone-answering mode, the record medium is rewound to the beginning of the announce message thereon at the conclusion of each incoming telephone call, thus being in condition to transmit that same announce message in response to the next incoming telephone call. After the announce message is transmitted, the record medium is advanced rapidly past all previously recorded incoming messages until the next available recording portion is reached.

27 Claims, 6 Drawing Figures

TELEPHONE-ADAPTER APPARATUS FOR A DICTATION UNIT

BACKGROUND OF THE INVENTION

This invention relates to apparatus for operating a dictation machine in various telephone-related modes and, more particularly, to such apparatus wherein the dictation machine is controlled to operate either as a telephone-answering device or as a remote dictation unit, to record messages received via a telephone line.

In many dictation machines which have been designed for business, or office use, a microphone is provided to convert speech, or voice signals, to corresponding electrical signals for recording on a record medium. Advantageously, various control switches are provided with the microphone unit so as to enable the user to establish various modes of operation of the machine, such as record, playback, rewind, fast-forward, and the like. The selected operation of these respective switches may energize the usual motors, solenoids and amplifier circuits which normally are provided in the dictation machine.

In addition to providing a microphone-input for receiving voice signals, some dictation machines also are provided with a so-called telephone input by which voice signals which are received from a telephone instrument are supplied directly to the recording circuits of the machine. A "telephone" selector switch may be provided to selectively connect either the microphone input or the telephone input to such recording circuits.

It may be desirable, in some installations, for the user of such a dictation machine to condition that machine to operate as a telephone-answering device so that telephone messages can be recorded in his absence. That user also may wish to use his dictation machine to record his own messages which are transmitted thereto from a remote location via the telephone line. It would appear that, if the dictation machine is provided with the aforementioned telephone-recording capability, control apparatus may be designed to accomplish telephone-answering and remote-dictation operations. Furthermore, if the dictation machine is electrically connected to the telephone line by a coupler, or adapter, such adapter can be selectively conditioned to supply the recording circuits of the dictation machine with voice signals which are received either from the telephone line or from the microphone.

OBJECTS OF THE INVENTION

Therefore, it is an object of the present invention to provide apparatus for accomplishing the foregoing.

Another object of this invention is to provide improved apparatus for use with a dictation machine, whereby that machine is adapted to operate as a telephone-answering device.

A further object of this invention is to provide apparatus for use with a dictation machine whereby that machine is adapted to operate selectively either as a telephone-answering device or as a remote-dictation device.

An additional object of this invention is to provide apparatus for controlling the operation of a dictation machine so as to allow that machine to operate in selected modes, including a telephone-answering mode and a remote-dictation mode.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for operating a dictation machine as a telephone-answering device. An announce message is recorded at a predetermined portion of the record medium which normally is provided with that dictation machine. A switching circuit is selectively operable to condition the dictation machine to operate as a telephone-answering device, and a telephone coupling connects that dictation machine to a telephone line. An arrangement is provided which is operable, when the dictation machine is conditioned to operate as a telephone-answering device, to respond to an incoming ringing signal on the telephone line for activating the record medium to advance at a playback speed so as to transmit the announce message over the telephone line and, at the conclusion of the announce message, to advance the record medium to the next available recording portion thereon to record an incoming message.

In another embodiment of this invention, the switching circuit is further operable to condition the dictation machine to record remote dictation, or messages, that are transmitted thereto via the telephone line.

Preferably, the apparatus of the present invention includes a microprocessor for controlling the operation of the dictation machine in the aforedescribed manner.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
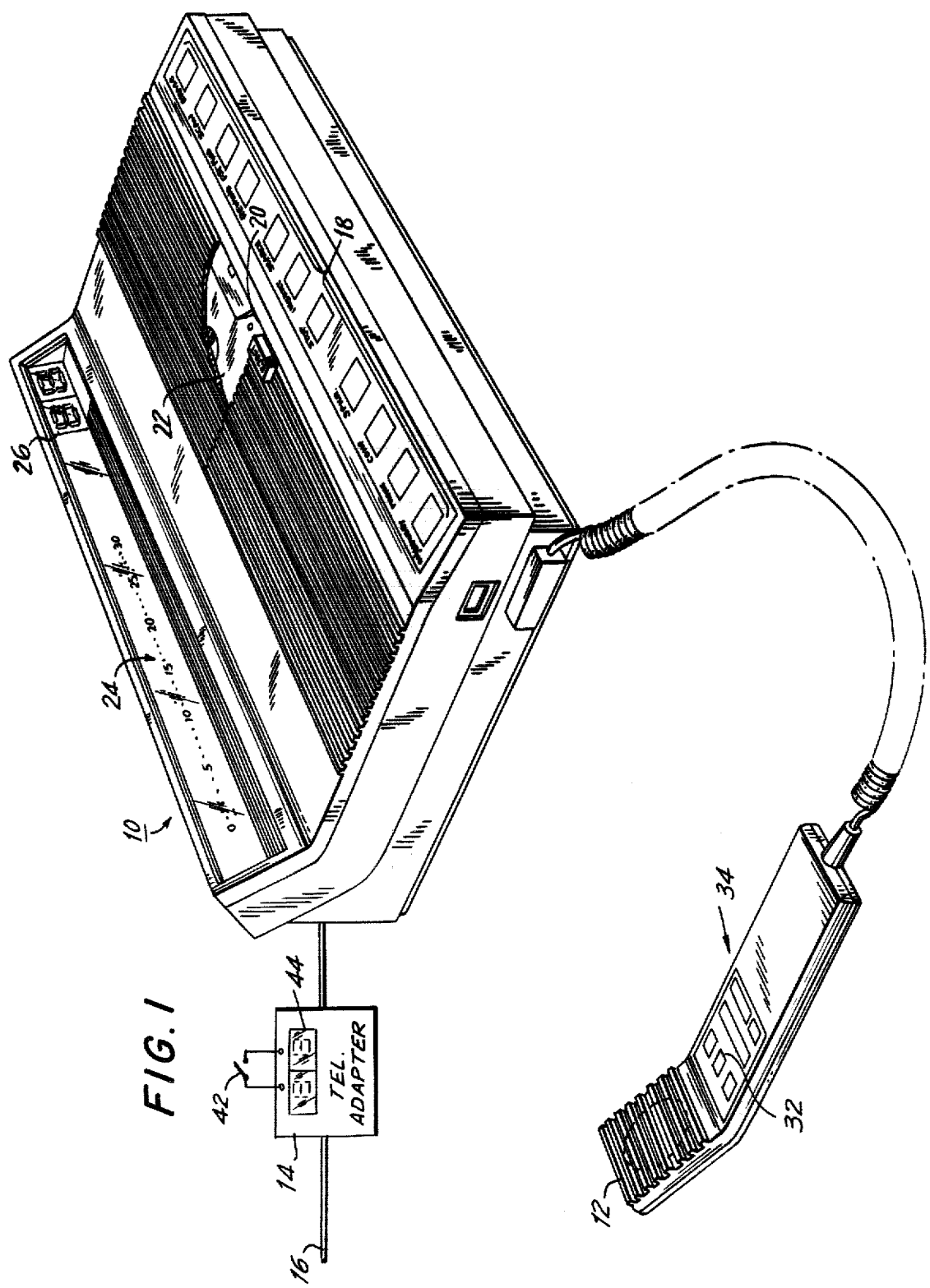
FIG. 1 is an overall view of one type of dictation machine with which the present invention can be used.

Referring now to the drawings, and in particular to FIG. 1, there is illustrated a representation of a dictation unit 10 with which the present invention finds ready application. This dictation unit includes a recording circuit (not shown) having the usual recording transducers, or heads, which may be selectively controlled to operate, additionally, as playback transducers. Also included in dictation unit 10 is one or more drive motors by which the record medium is advanced for a recording or playback operation, or is moved for a rewind or fast-forward operation. Such operations are conventional and well known to those of ordinary skill in the art. Typically, the record medium upon which dictated messages are recorded by dictation unit 10 is magnetic tape. Preferably, this magnetic tape is contained within a tape cassette 22 disposed within a suitable cassette compartment 20 of the dictation unit.

Dictation unit 10 is electrically connected to a hand-held microphone unit 12, whereby voice signals are supplied to the recording circuit of the dictation unit from the microphone unit. The microphone unit preferably is provided with a microphone pick-up 32 which functions as a transducer to convert audible speech into corresponding electrical signals. The microphone unit also is provided with control switches 34 which are manually operable to control the various operations capable of being performed by dictation unit 10. For example, selected operation of such control switches establishes a recording mode, a playback mode, a rewind mode and a fast-forward mode. Also, predetermined control signals, or tones, may be produced as a result of the operation of control switches 34, which tones are recorded on the record medium to indicate various instructions to a transcriber for subsequent transcription of the dictated messages. It may, therefore, be appreciated that microphone unit 12 is capable of performing various conventional functions that have been performed heretofore by other microphone units known to those of ordinary skill in the art for use with dictation apparatus.

Dictation unit 10 is provided with a plurality of control switches 18, each switch being manually operable to control a particular function or establish an appropriate mode of operation for the dictation unit. Typical of such control switches are a telephone-mode selector switch TEL, an on/off power switch ON, a fast-forward selector switch FF, a rewind selector switch REW, a stop selector switch STOP and a scan selector switch SCAN. The telephone-mode selector switch TEL is adapted, when operated, to establish a telephonerecording mode of operation for dictation unit 10. As will be described in greater detail below, when in the telephone recording mode, the dictation unit is controlled by control apparatus, to be described, provided in telephone adapter 14 so as to record messages received from the telephone line on the record medium. More particularly, in its telephone recording mode, dictation unit selectively functions either as a telephone-answering machine or as a remote-dictation machine. If the telephone-mode selector switch is not operated, or actuated, the dictation unit functions as a typical dictation machine for recording messages received from microphone unit 12.

Fast-forward selector switch FF is adapted, when operated, to establish the fast-forward mode of operation. In this mode, the record medium, that is, the magnetic tape housed within cassette 22, is transported in its forward direction at a relatively rapid rate. A fast-forward control circuit (not shown) may be provided for energizing a fast-forward drive motor in response to a fast-forward actuating signal supplied thereto. Such a fast-forward actuating signal is produced in response to the manual operation of fast-forward selector switch FF. As will be described in greater detail below, a suitable fast-forward actuating signal also may be produced by the control apparatus of the present invention.

Rewind selector switch REW may be similar to the aforementioned fast-forward selector switch FF, and may be adapted to produce a rewind actuating signal for actuating a rewind circuit (not shown) which energizes a suitable drive motor to transport the record medium in its reverse direction at a relatively high speed. A suitable rewind actuating signal also may be produced by the apparatus of the present invention.

Stop selector switch STOP is manually operable to establish a STOP, or quiescent, mode of operation for dictation unit 10. Typically, the stop selector switch may be operated to terminate a fast-forward or rewind mode of operation.

Scan selector switch SCAN is adapted, when operated, to initiate a rewind operation and, also, to enable a playback transducer to detect instruction signals that may be recorded on the record medium. Such detected instruction signals are used to provide a visual display to, for example, a transcriptionist, representing the relative locations of particular instructions that have been recorded along the length of record medium. Suitable apparatus which can be used in conjunction with scan selector switch SCAN is described in U.S. application Ser. No. 907,035, now U.S. Pat. No. 4,200,893.

As illustrated, dictation unit 10 also is provided with an index/instruction display 24 and a numerical display 26. The index/instruction display is described in greater detail in the aforementioned U.S. patent application. The purpose of this display is to provide indications of the locations of particular instructions which are recorded on the record medium, such as will be produced during a scan operation initiated by the actuation of scan selector switch SCAN. Display 24 also provides an index, or cursor indication, of the present relative location of the record medium. For example, if the record medium is a magnetic tape, as this tape is driven in a particular direction, a respective display element, such as an LED, an LCD, a light source, or the like, is energized to indicate that portion of the tape which is at or within the vicinity of the recording (or playback) transducer. As the tape is advanced from one end toward the other, a corresponding cursor indication is advanced across display 24. Reference is made to the aforementioned U.S. patent application for a further description of index/instruction display 24.

Numerical display 26 may be comprised of a multi-digit display, such as a two- or three-digit seven-segment display, which, among other functions, is adapted to display the total length of dictation which has been recorded on the record medium. This display may be controlled by a counter which counts pulses that are produced when the tape is transported, such as described in the aforementioned application.

Telephone adapter 14 may be formed integrally with dictation unit 10 or, as shown in the illustrated embodiment, may comprise a separate component that is electrically connected to the dictation unit. The telephone adapter may include suitable coupling to interconnect the dictation unit with telephone line 16 so as to permit voice signals to be communicated therebetween. Typically, telephone adapter 14 may include a coupling transformer and suitable impedance-matching networks. Also, the telephone adapter may include a ring detector circuit for detecting an incoming ringing signal transmitted from a remote location via telephone line 16, and a line seizing circuit actuated in response to the detected incoming ringing signal to seize, or properly terminate, the telephone line so as to answer the incoming telephone call. Telephone adapter 14 additionally is provided with a so-called announce length switch 42 which is operable to condition suitable apparatus included within telephone adapter 14 (to be described below) for operating dictation unit 10 either as a telephone-answering device or as a remote-dictation machine for recording dictated messages that are transmitted thereto via telephone line 16. A call-counter display also is provided to display the total number of incoming messages which have been recorded.

The apparatus which is used to control dictation unit 10 for operating as a telephone-answering device or a remote-dictation machine now will be described with reference to the embodiments of FIGS. 2A and 2B. If the user of dictation unit 10 wishes to condition it to operate as a telephone-answering machine, he first dictates an announcement message on the record medium, preferably by operating microphone unit 12 in conventional manner. Then, announce length switch 42 is closed and the rewind selector REW is actuated. The record medium thus is rewound, and pulses produced during this rewinding are counted. When the medium returns to the beginning thereof, the total pulse count represents the length of the announce message. This count is stored as an announce length count for a purpose to be described. It may be appreciated that if an announcement message is not recorded, the announce length count is equal to zero.

When the telephone-mode selector switch TEL is actuated, the dictation unit is enabled to respond to incoming telephone calls in the manner of a telephone-answering machine. As will be explained in greater detail below, in this mode of operation, the recorded announcement message is played back in response to an incoming telephone call, this announcement message being transmitted to the calling party via telephone line 16. At the conclusion of the announcement message, the record medium is advanced to the next available recording portion thereon to record the incoming message which is expected from the calling party. A suitable signal, such as a warning signal, or go-ahead signal, is transmitted to the calling party while the record medium is advanced to its next available recording portion. At the completion of the incoming telephone message, numerical display 44 is updated so as to indicate the total number of messages which have been recorded on the record medium; and the record medium is rewound to the beginning of its announcement message, whereupon dictation unit awaits the next incoming telephone call.

As an alternative mode of operation, the user may close announce length switch 42 and actuate rewind selector switch REW without recording an announcement message. Since, in this mode, the record medium remains at its initial position and is not rewound, the aforementioned announce length count is equal to zero, thereby conditioning the dictation unit to operate as a remote-dictation machine. In this mode, as will be described below, an incoming telephone call is "answered" and the dictation unit is triggered to its recording mode in order to record the incoming message which is expected from the calling party.

At the completion of this message, that is, at the termination of the telephone call, dictation unit 10 is returned to its quiescent condition to await the next incoming telephone call. Hence, in this mode of operation, the user of the dictation unit may dictate messages to it from any remote location merely by telephoning his unit and then transmitting his message.

Figure 2A:
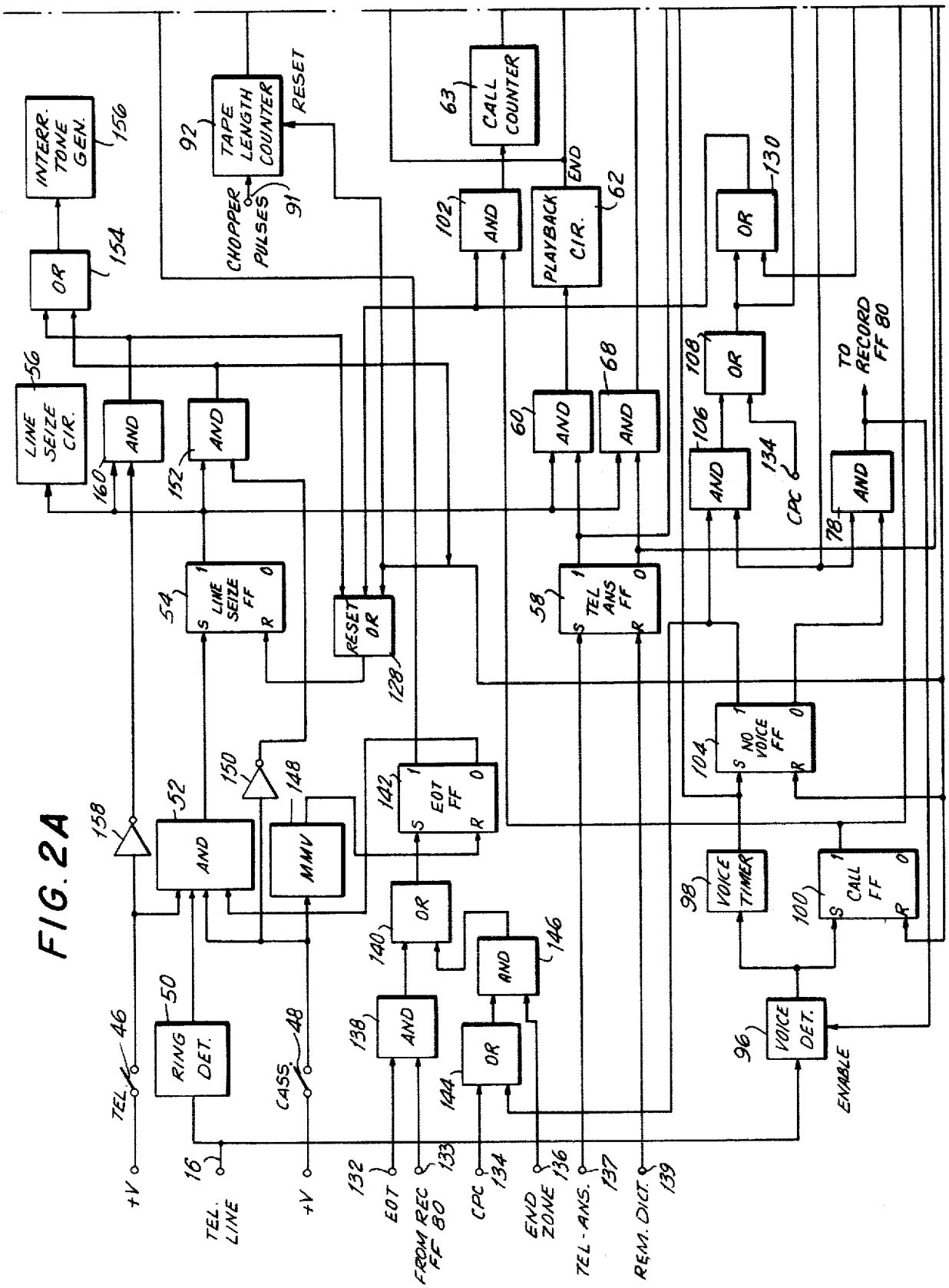
FIGS. 2A and 2B are logic circuit diagrams of the control apparatus in accordance with the present invention.
Figure 2B:
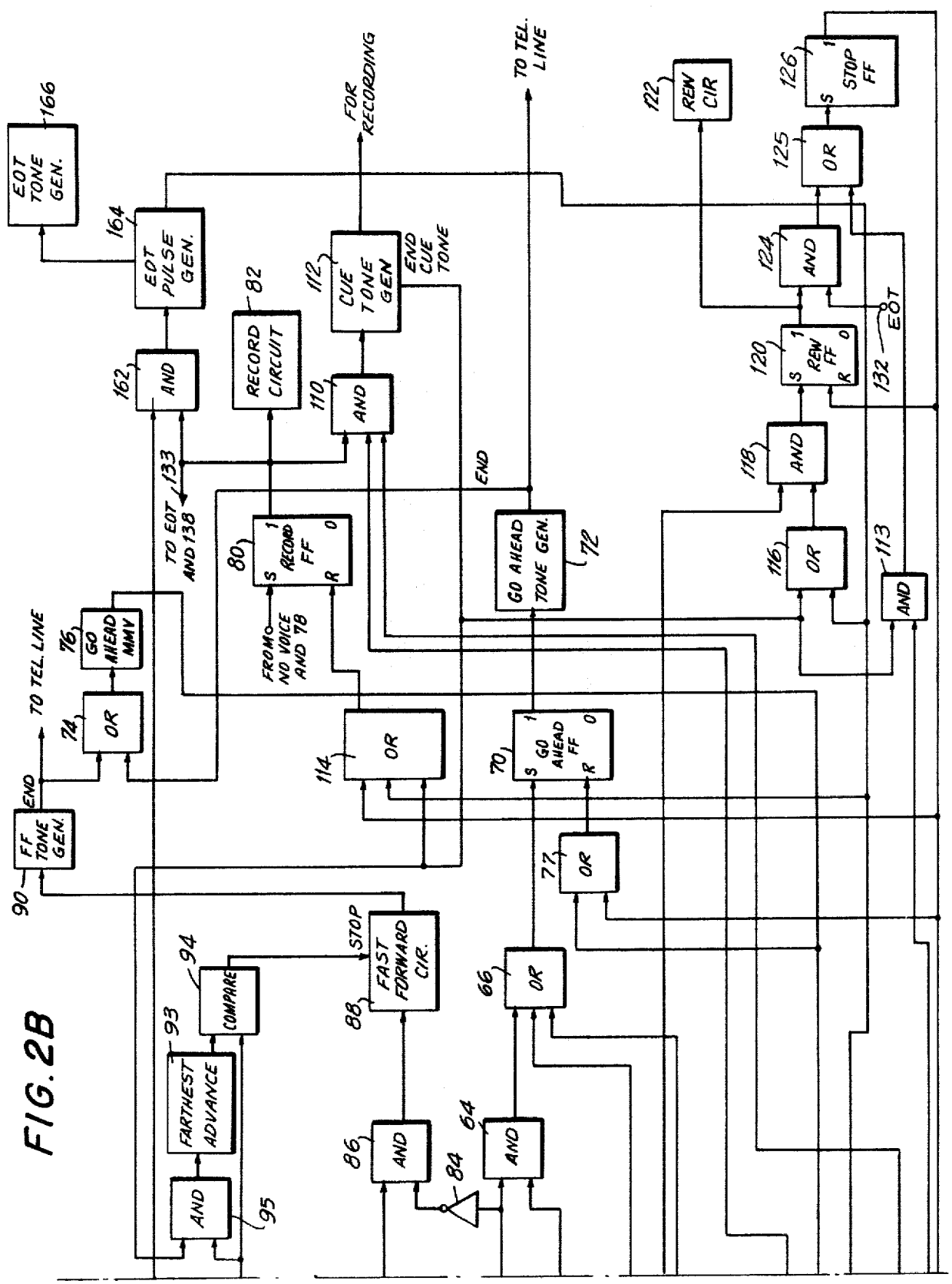

Turning more specifically to the embodiment shown in FIGS. 2A and 2B, it should be understood that the illustrated logic circuit merely is one embodiment of apparatus capable of carrying out the present invention. As will be described with respect to FIGS. 3A-3C, the logic circuit may be implemented by a programmed micro-processor.

For the purpose of describing the logic circuit of FIGS. 2A and 2B, it is assumed that conventional AND and OR gates are utilized, as well as conventional logic inverter circuits and bi-state devices, or flip-flop circuits. In the operation of such logic elements, it is assumed that a binary "1" is represented by a relatively higher, or positive voltage level, and a binary "0" is represented by a relatively lower voltage level, such as ground potential. Furthermore, an AND gate produces an output binary "1" only if each of its inputs is supplied with a binary "1". An OR gate produces an output binary "1" when any of its inputs is supplied with a binary "1". The flip-flop circuits described herein preferably are set-reset devices (R/S flip-flop circuits) which are triggered by the positivegoing transition in the logic signal, or voltage, applied thereto. Other elements included in the logic circuit of FIGS. 2A and 2B will be explained as the description of this circuit proceeds.

The logic circuit of FIGS. 2A and 2B is comprised of various control circuits capable of performing particular functions in accordance with the selected mode of operation of dictation unit 10. For convenience, these control circuits may be categorized as a mode-select circuit, a trigger circuit, an announce circuit, a go-ahead circuit, a recording arrangement, a voice detector, a call completion detector, a call counter, a cue signal recording circuit and a rewind arrangement. The mode-select circuit is comprised of an announce length count detector (not shown) and telephone answering flip-flop circuit 58. If the announce length count is detected as not being equal to zero, or greater than a predetermined count, a TEL ANS binary "1" signal is produced. If the announce length count is equal to zero, or less than the predetermined count, a REM DICT binary "1" signal is produced. The TEL ANS signal is applied to an input terminal 137 and the REM DICT signal is applied to an input terminal 139. Input terminal 137 is connected to the set input S of telephone answering flip-flop circuit 58, whereas input terminal 139 is connected to the reset input R of this telephone answering flip-flop circuit. The telephone-answering flip-flop circuit is set to its telephone-answering state when the TEL ANS signal is produced. Conversely, telephone-answering flip-flop circuit 58 is reset to its second state when the REM DICT signal is produced. As is conventional, a binary "1" is provided at the 1 output of the telephone-answering flip-flop circuit when this circuit has been set to its first state; and a binary "1" is provided at the 0 output thereof when this flip-flop circuit is reset to its second state. The 1 and 0 outputs of telephone-answering flip-flop circuit 58 are connected to respective inputs of AND gates 60 and 68 so as to selectively condition this AND gates in accordance with the state exhibited thereby.

The trigger circuit is comprised of a ring detector 50, and AND gate 52, a line seize flip-flop circuit 54, a line seize circuit 56 and AND gate 68. Ring detector 50 is connected to telephone line 16 and may be a conventional circuit adapted to detect the presence of an incoming ringing signal and to produce a binary "1" in response thereto. The output of ring detector 50 is connected to one input of AND gate 52. The remaining inputs of AND gate 52 are connected to a telephone selector switch 46, a cassette switch 48 and the 0 output of an end-of-tape (EOT) flip-flop circuit 142. Telephone selector switch 46 may correspond to, or be ganged for simultaneous operation with, the aforementioned telephone-mode selector switch TEL included as one of the control switches 18 of dictation unit 10 (FIG. 1). Telephone selector switch 46 is connected to a source of operating potential +V and supplies a binary "1" to AND gate 52 when actuated. Hence, when the user of dictation unit 10 desires to initiate a telephone mode of operation, for example, to operate his dictation unit either as a telephone-answering machine or as a remote-dictation machine, telephone selector switch 46 is closed to condition AND gate 52 to respond to a ring indicating signal produced by ring detector 50.

Cassette switch 48 may be provided in cassette compartment 20 and is adapted to be closed when a cassette 22 is present therein. Cassette switch 48 also is coupled to the source of operating potential +V so as to supply a binary "1" to AND gate 52 when a cassette is properly loaded in dictation unit 10.

EOT flip-flop circuit 142 is described in greater detail below. This flip-flop circuit is adapted to provide an indication that, during operation thereof, the record medium has been advanced such that less than a predetermined amount thereof is available for recording a received message. For example, if the record medium comprises a magnetic tape, the EOT flip-flop circuit is adapted to provide an indication that the end-of-tape has been reached, such as while recording messages thereon. This flip-flop circuit also provides such an indication in response to certain conditions (described below) when the tape has been advanced to its "end zone", that is, to a position wherein less than a predetermined amount, for example, three minutes, of dictation can be recorded. The 0 output of EOT flip-flop circuit 142 is adapted to supply a binary "1" to AND gate 52 when there is sufficient record medium available for recording messages.

The output of AND gate 52 is connected to the set input S of line seize flip-flop circuit 54. The reset input R of this flip-flop circuit is coupled to an OR gate 128, referred to as a reset OR gate, for receiving a binary "1" therefrom when the illustrated apparatus is to be reset to a quiescent condition, for example, at the completion of an incoming telephone call. The 1 output of line seize flip-flop circuit 54 is connected to a line seize circuit 56 and also to respective inputs of AND gates 60, 68, 152 and 160. Line seize circuit 56 may be a conventional circuit, normally provided in telephone-answering apparatus, and including, for example, a relay device which is energized in response to the setting of line seize flip-flop circuit 54 to provide a suitable termination to telephone line 16. The energization of line seize circuit 56 thus seizes the telephone line to "answer" an incoming telephone call. Of course, when the line seize flip-flop circuit is reset, line seize circuit 56 is de-energized to release the telephone line, thus simulating a "hang-up" operation.

AND gate circuit 68 is coupled to the announce circuit to initiate operation of dictation unit 10 in its playback mode. More particularly, the output of AND gate 68 is coupled via an OR gate 66 to the set input S of a go-ahead flip-flop circuit 70.

The announce circuit includes AND gate 60, one input of which is connected to the 1 output of line seize flip-flop circuit 54, as described above, and the other input of which is connected to the 1 output of telephone answering flip-flop circuit 58. Hence, AND gate 60 is adapted to be energized when the line seize flip-flop circuit is triggered to its set state and the telephone answering flip-flop circuit exhibits its first state, representing the selection of the telephone-answering mode of operation. The output of AND gate 60 is connected to a playback circuit 62 and, when energized, is adapted to trigger this playback circuit to initiate its operation. Playback circuit 62 may be included in dictation unit 10 and, when triggered, energizes the record medium transport mechanism to advance the record medium past a playback transducer such that the announcement message recorded thereon is reproduced. Although not shown herein, such reproduced announcement message is transmitted over a telephone line 16 to the calling party.

In one embodiment thereof, playback circuit 62 may operate for a predetermined length of time, thus establishing a predetermined maximum duration of the announcement message. Alternatively, the announcement message may exhibit any desirable length, as represented by the aforementioned announce length count. This count serves to define the duration over which playback circuit 62 operates. That is, during a playback operation, the pulses produced when the record medium is advanced are counted, and when this count is equal to the announce length count, the playback operation terminates and the dictation unit is conditioned to record an incoming telephone message. As yet another alternative thereof, the completion of the announcement message may be indicated by the recording of a predetermined tone signal, and playback circuit 62 may include a suitable tone detector for sensing the completion of this announcement message. Regardless of the particular embodiment selected, the playback circuit is adapted to produce an output pulse upon the completion of the announcement message. This output pulse is provided at the output of playback circuit 62 and is supplied to respective inputs of AND gates 64 and 86.

AND gate 64 includes another input connected to the output of a call counter 63. This call counter may comprise, for example, a conventional digital or binary counter whose count is incremented in response to pulse signals supplied thereto from an AND gate 102. As will be explained below, the count of call counter 63 is incremented following the completion of each incoming telephone call, provided that an incoming message has been recorded. If no incoming message had been recorded, the count of the call counter is not incremented. Thus, the count of call counter 63 provides an indicattion of the total number of incoming telephone call messages that have been recorded. When this count is equal to zero, a binary "1" is supplied from call counter 63 to AND gate 64. If this count is other than zero, a binary "0" is supplied to AND gate 64. The output of this AND gate is supplied via OR gate 66 to the set input S of go-ahead flip-flop circuit 70 included in the go-ahead circuit.

The output of call counter 63 also is supplied, via an inverter 84, to an input of AND gate 86, the other input of which is connected to the output of playback circuit 62. It is appreciated that AND gates 64 and 86 are complementary in that one or the other is energized in response to the output pulse produced by the playback circuit, the particular AND gate which is energized being a function of whether the count of call counter 63 is zero. That is, if this count is other than zero, that is, if one or more incoming telephone call messages have been recorded, AND gate 86 is energized in response to the output pulse supplied thereto by playback circuit 62. The output of AND gate 86 is connected to a fast forward circuit 88.

The fast forward circuit may be included in dictation unit 10 and may include, for example, a suitable drive motor which is energized to transport the record medium in the forward direction at a relatively rapid rate. Once actuated, the fastforward circuit may be deactuated in response to a stop signal supplied to, for example, a disable input thereof. Preferably, fast forward circuit 88 produces an output signal of, for example, a binary "1" level, throughout the duration that it transports the record medium in the fast forward mode. This output signal is supplied to a fast forward tone generator 90 which generates a suitable fast forward tone signal in response to this output signal. The output of fast forward tone generator is coupled to telephone line 16 so as to return the fast forward tone to the calling party, thus advising him that the record medium is being driven in this mode. As will be explained, this fast forward tone signal functions as a warning signal which, normally, is recognized by the calling party as an indication that, at the termination of such signal, he may commence his message for recording. Preferably, at the completion of the fast forward tone signal, which is determined by the completion of the output signal produced by fast forward circuit 88, a suitable output trigger pulse is produced by the fast forward tone generator.

The disable input of fast forward circuit 88 is connected to the output of a comparator 94, this comparator being supplied with the count of a farthest advance counter 93 and also with the count produced by a tape length counter 92. Comparator 94 is adapted to detect when the respective counts supplied thereto are equal and to produce the aforementioned stop signal in response thereto. The comparator may, therefore, comprise a conventional logic comparison circuit. Tape length counter 92 includes an input connected to an input terminal 91 which is supplied with pulses that are produced when the tape is transported. These pulses may, for example, be produced by a so-called chopper wheel that is mechanically coupled to the tape transport mechanism, as described in Application Ser. No. 907,035, thereby representing a corresponding length of tape. Farthest advance counter 93 is adapted to store this tape-length count at the completion of each incoming telephone message. For this purpose, the count of tape length counter 92 is supplied to farthest advance counter 93 by an AND gate 95 which is enabled at the completion of the incoming telephone message. Hence, the farthest advance count of counter 93 represents the total length of tape which had been transported up until the end of the immediately preceding incoming telephone message. The tape length and farthest advance counters also include reset inputs connected to the 1 output of a stop flip-flop circuit 126 for a purpose to be described below.

The go-ahead circuit, included in the apparatus illustrated in FIGS. 2A and 2B, is comprised of a go-ahead tone generator 72, OR gate 74, a monostable multivibrator (referred to herein as the go-ahead mmv) 76 and fast forward tone generator 90. Go-ahead tone generator 72 has its input connected to the 1 output of go-ahead flip-flop circuit 70. When this flip-flop circuit is set to produce a binary "1" at its 1 output, the positive transition of this output triggers go-ahead tone generator 72 to generate a go-ahead signal, such as of a predetermined tone frequency, for a predetermined time duration. Suitable tone generators may be provided for this purpose, and one of ordinary skill in the art would be fully enabled to construct a go-ahead tone generator for use with the illustrated apparatus. The output of go-ahead tone generator 72 is coupled to telephone line 16 so as to transmit the go-ahead signal to the calling party via the telephone line. The output of generator 72 also is coupled to go-ahead mmv 76 via OR gate 74. At the completion of the go-ahead signal, the pulse is supplied to the go-ahead mmv via OR gate 74, from go-ahead tone generator 72. Similarly, when the aforedescribed fast forward tone is completed, fast forward tone generator 90 supplies a pulse to go-ahead mmv 76 via OR gate 74.

Go-ahead mmv 76 is triggered by the pulse supplied thereto from OR gate 74 to generate a pulse signal of predetermined duration. The output of this go-ahead mmv is supplied to the reset input R of go-ahead flip-flop circuit 70 via an OR gate 77, and also to respective inputs of AND gates 78 and 106. Thus, at the completion of the go-ahead signal or fast forward warning signal, go-ahead mmv 76 is triggered to reset go-ahead flip-flop circuit 70 and also to energize one or the other of AND gates 78 and 106, depending upon the condition of no-voice flip-flop circuit 104, as will be described.

The recording arrangement illustrated in FIGS. 2A and 2B is comprised of a record flip-flop circuit 80, AND gate 78 and record circuit 82. The set input S of record flip-flop circuit 80 is connected to the output of AND gate 78 and is adapted to received a binary "1" therefrom when this AND gate is energized. As will be described below, AND gate 78 is energized when go-ahead mmv 76 is triggered and no-voice flip-flop circuit 104 exhibits its reset condition. The 1 output of record flip-flop circuit 80 is connected to record circuit 82. This record circuit may be included within dictation unit 10 and includes, for example, a suitable drive motor for transporting the record medium at its predetermined recording speed and, moreover, includes a recording transducer adapted to be energized for recording voice signals supplied thereto on the record medium. Preferably, record circuit 82 is energized to carry out a recording operation when record flip-flop circuit 80 exhibits its set state.

The 1 output of record flip-flop circuit 80 also is connected to respective inputs of AND gates 110 and 162, and also to the input of an AND gate 138 via a connection terminal 133. As will be described, AND gate 138 is provided for the purpose of determining when the record medium has reached its end (for example, end-of-tape) during a recording operation.

The reset input R of record flip-flop circuit 80 is connected to the output of an OR gate 114, one input of this OR gate being connected to the 1 output of aforementioned stop flip-flop circuit 126, another input of this OR gate being connected to a cue tone generator 112, to be described, and the other illustrated input of this OR gate being connected to the output of a pulse generator 164, also to be described. The connection of OR gate 114 to stop flip-flop circuit 126 may, if desired, be omitted. It will be appreciated from the forthcoming description, that OR gate 114 serves to reset record flip-flop circuit 80 following the completion of a telephone call.

The voice detector arrangement included in the illustrated apparatus is comprised of a voice detector circuit 96 and a call flip-flop circuit 100. Voice detector circuit 96 is coupled to telephone line 16 to detect the presence of incoming voice signals thereon. Such voice detector circuits are known to those of ordinary skill in the art and further description thereof is not provided. Suffice it to say that, when a voice signal is detected, the output of voice detector circuit 96 produces a binary "1" level signal. The voice detector circuit also includes an enable input which is coupled to the output of AND gate 78 so as to be enabled to detect incoming voice signals during a recording operation.

Call flip-flop circuit 100 has its set input S connected to the output of voice detector 96 and is adapted to be set to its set condition when voice signals are detected. The 1 output of call flip-flop circuit 100 is coupled to one input of AND gate 102 so as to enable this AND gate to supply an incrementing pulse to call counter 63 at the completion of a telephone call. It may be appreciated that, if no voice signals are received via telephone line 16, call flip-flop circuit 100 remains in its reset condition so as to disable AND gate 102. Consequently, the count of call counter 63 will not be incremented at the completion of this telephone call. The reset input R of call flip-flop circuit 100 is connected to the 1 output of aforementioned stop flip-flop circuit 126.

As mentioned above, the count of call counter 63 is incremented in response to the completion of a telephone call. A telephone call completion detector, which serves to detect when a telephone call has been completed, is comprised of a voice timer 98, no-voice flip-flop circuit 104, AND gate 106 and OR gates 108, 128 and 130. Voice timer 98 may be comprised of a suitable timing circuit which is reset to an initial condition in response to the binary "1" supplied thereto from voice detector circuit 96 and, when this binary "1" terminates, it initiates a time-out cycle of predetermined duration. At the completion of this time-out cycle, voice timer 98 is adapted to generate an output pulse which is coupled to the set input S of no-voice flip-flop circuit 104 and, additionally, to the set input S of go-ahead flip-flop circuit 70 via OR gate 66.

No-voice flip-flop circuit 104 has its 1 output connected to one input of AND gate 106 and, additionally, to one input of an AND gate 146 via an OR gate 144. The reset input R of this no-voice flip-flop circuit is connected to the 1 output of aforementioned stop flip-flop circuit 126. It is appreciated that, at the commencement of an incoming telephone call, the no-voice flip-flop circuit exhibits its reset state to disable AND gate 106. The 0 output of no-voice flip-flop circuit 104 is connected to AND gate 78 to enable this AND gate initially. Once an incoming voice signal is detected, no-voice flip-flop circuit 104 is adapted to be set by voice timer 98 at a predetermined time following the termination of such voice signals. However, if no voice signals are detected, the no-voice flip-flop circuit remains in its reset condition.

AND gate 106 is adapted to be energized by the pulse signal produced by go-ahead mmv 76 after a no voice condition has been detected, as will be described. The output of AND gate 106 is coupled via OR gate 108 to AND gate 110. The output of OR gate 108 also is coupled to AND gate 95 and, via OR gate 130, to an input of AND gate 102 and, also, to an input of OR gate 128. It will be shown that no-voice flip-flop circuit 104 is set at the termination of incoming voice signals, that is, at the completion of an incoming telephone call, and the setting of this flip-flop circuit serves to increment the count of call counter 63 and also to reset line seize flip-flop circuit 54 via OR gate 128.

Another input to OR gate 108 is coupled to input terminal 134, this input terminal being adapted to receive a signal that the calling party has released the telephone line. As is known, in most telephone networks, when a calling party "hangs up", the telephone central office transmits a supervisory hang-up pulse, representing that the calling party has hung up. In other telephone networks, such a supervisory pulse is not transmitted by the central office but, rather, a so-called hang-up pulse is produced inherently. Both the supervisory pulse and this hang-up pulse are referred to as calling party control (CPC) pulses. Input terminal 134 is adapted to receive a representation that a CPC pulse has occurred. Suitable CPC detecting circuits may be provided in telephone adapter 14 to supply such a CPC pulse to input terminal 134. Thus, upon completion of a telephone call, as represented by the occurrence of this CPC pulse, a corresponding pulse is transmitted to OR gate 108. This CPC pulse also is supplied to an OR gate 144, to be described below.

At the completion of a telephone call, a cue signal, such as a cue tone of predetermined frequency, is recorded on the record medium. The cue signal recording circuit which is provided for generating such a cue signal is comprised of AND gate 110 and cue tone generator 112. The respective inputs of this AND gate are connected to the 1 output of record flip-flop circuit 80, to the output of OR gate 108 and to the 1 output of call flip-flop circuit 100. Thus, when the dictation unit is in its record mode, as represented by the set state of record flip-flop circuit 80, and when an incoming voice signal has been detected, as represented by the set state of call flip-flop circuit 100, then, upon the completion of an incoming telephone call, as represented by a pulse signal produced at the output of OR gate 108, AND gate 110 is energized. At this time, AND gate 95 also is energized. The output of AND gate 110 is connected to cue tone generator 112 to actuate this generator so as to produce a suitable cue tone signal. This cue signal is supplied to the recording transducer in dictation unit 10 for recording on the record medium. At the completion of this cue signal, cue tone generator 112 generates an output pulse which is supplied to OR gates 114 and 116, and also to an AND gate 113. As will be described, this output pulse serves to reset record flip-flop circuit 80 and initiate a rewind mode of operation wherein the record medium is rewound to the beginning of the announcement message.

The rewind arrangement is comprised of OR gate 116, AND gate 118, rewind flip-flop circuit 120 and rewind circuit 122. As mentioned above, one input of OR gate 116 is coupled to cue signal generator 112 to receive the output pulse generated by the cue signal generator at the completion of the cue signal. The other input of this OR gate is coupled to an EOT pulse generator 164 which is adapted to generate an output pulse when an end-of-medium, such as an end-of-tape (EOT) signal is received by the illustrated apparatus from dictation unit 10 when the record medium, for example, the magnetic tape, has been driven to its end or, alternatively, to a position where an insufficient amount of record medium is available for recording further messages. The output of OR gate 116 is coupled to one input of AND gate 118, the other input of which is coupled to the 1 output of telephone answering flip-flop circuit 58. This AND gate is adapted to be energized when the illustrated apparatus is in its telephone-answering mode of operation and an output pulse is received either from cue signal generator 112 or EOT pulse generator 164.

The output of AND gate 118 is coupled to the set input S of rewind flip-flop circuit 120. This rewind flip-flop circuit is adapted to be set when AND gate 118 is energized. The reset input R of this flip-flop circuit is coupled to the 1 output of stop flip-flop circuit 126. Thus, when the stop flip-flop circuit is triggered to its set state, rewind flip-flop circuit 120 is reset. The 1 output of this rewind flip-flop circuit is coupled to rewind circuit 122 which, preferably, is included within dictation unit 10 and includes a suitable rewind motor and motor-drive circuit for initiating a rewind operation. Suitable rewind circuits are known to those of ordinary skill in the art and, in the interest of brevity, further description thereof is not provided.

The 1 output of rewind flip-flop circuit 112 also is coupled to an input of an AND gate 124, the other input of which is connected to an input terminal 132 for receiving the aforementioned EOT signal. It is recalled that the EOT signal is produced by dictation unit 10 when the record medium, for example, a magnetic tape, is driven to its end. For example, when the record medium is rewound completely, the EOT signal is produced when the beginning of the medium is reached. The output of AND gate 124 is coupled to the set input S of stop flip-flop circuit 126 by an OR gate 125. The stop flip-flop circuit is adapted, when set, to establish a quiescent condition for dictation unit 10. In this quiescent condition, the record medium is not driven, and the apparatus awaits either the next incoming telephone call or some other operator-initiated mode of operation. The other input of OR gate 125 is coupled to the output of aforementioned AND gate 113 whose inputs, it is recalled, are connected to cue signal generator 112 and to the 0 output of telephone answering flip-flop circuit 58. Although not shown in FIG. 2B, the reset input R of stop flip-flop circuit 126 is adapted to be supplied with a reset signal after the aforementioned quiescent condition of the illustrated apparatus has been initiated. This may be achieved by, for example, coupling the reset input R of this flip-flop circuit to the 1 output thereof via a suitable delay circuit (such as a monostable multivibrator).

EOT flip-flop circuit 142 is adapted to be set to produce a binary "1" at its 1 output when the record medium of dictation unit 10 has been advanced to a position such that an insufficient amount of record medium is available for recording further messages. The set input S of EOT flip-flop circuit 142 is coupled to the output of an AND gate 138 and also to the output of an AND gate 146 via OR gate 140, as illustrated. AND gate 138 is adapted to be energized when, during the recording of a telephone message, the record medium is exhausted. Accordingly, one input of this AND gate is connected to input terminal 132 to be supplied with the EOT signal, and the other input of this AND gate is connected to connection terminal 133 to receive a binary "1" when record flip-flop circuit 80 exhibits its set state. AND gate 146 includes an input connected to input terminal 136 to receive an end-zone signal. This endzone signal is produced by dictation unit 10 when less than a predetermined amount of record medium is available for further recording. If the record medium is, for example, a magnetic tape housed within cassette 22 (FIG. 1), then the end-zone signal may be produced when, during a normal recording operation, suitable sensing apparatus senses that the supply reel of the cassette rotates at a speed which is greater than a predetermined threshold or, alternatively, sensing apparatus senses that the take-up reel of the cassette rotates at a speed which is less than some predetermined speed. Suitable sensing apparatus is known to the prior art, and one example of circuitry which can be used for this purpose is described in U.S. Pat. No. 4,099,209. The other input of AND gate 146 is coupled to an OR gate 144 whose inputs are, in turn, connected to input terminal 134 and to the 1 output of no-voice flip-flop circuit 104. The purpose of OR gate 144 is to detect the completion of an incoming telephone call, as may be represented by a CPC signal, described above, or by the setting of the no-voice flip-flop circuit.

The 1 output of EOT flip-flop circuit 142 is connected to an input of AND gate 162, the other input of which is connected to the 1 output of record flip-flop circuit 80, as described above. AND gate 162 is adapted to be energized when dictation unit 10 is in its record mode, as represented by the set state of record flip-flop circuit 80, and the end of the record medium has been reached, as represented by the set state of EOT flip-flop circuit 142. The output of AND gate 162 is connected to EOT pulse generator 164 to actuate this pulse generator. EOT pulse generator 164 is coupled to an EOT tone generator 166 to actuate this tone generator to generate a predetermined warning tone, referred to herein as the EOT tone, for a predetermined time duration determined by the number (or duration) of pulses (or pulse) generated by the EOT pulse generator. This EOT pulse generator also is coupled to OR gates 114, 116 and 130, as described above, to energize these OR gates when the predetermined number of EOT pulses are generated (or at the completion of the EOT pulse of predetermined duration). The EOT tone signal is transmitted over telephone line 16 and serves as a warning to the calling party that the end of record medium has been reached.

The apparatus illustrated in FIG. 2A also includes an interrupt tone generator 156 which is adapted to generate an interrupt tone signal in the event of predetermined occurrences. This interrupt tone signal results in an interrupt warning tone which, preferably, is an audible tone which can serve the purpose of warning an individual in the vicinity of dictation unit 10 that one of the aforementioned predetermined conditions has occurred. For example, the interrupt tone generator is actuated when the telephone mode of operation of the dictation unit inadvertently is terminated while telephone line 16 is seized. For this purpose, telephone switch 46 is coupled, via an inverter 158, to one input of an AND gate 160, the other input of which is coupled to the 1 output of line seize flip-flop circuit 54. The output of this AND gate is coupled to interrupt tone generator 156 via an OR gate 154.

Another condition which will result in the actuation of interrupt tone generator 156 is the inadvertent removal of a cassette from cassette compartment 20 of dictation unit 10. The occurrence of this condition is sensed by an AND gate 152 which is provided with one input coupled to cassette switch 48 via an inverter 150, and another input coupled to the 1 output of line seize flip-flop circuit 54. The output of this AND gate is coupled to interrupt tone generator 156 by OR gate 154.

A monostable multivibrator 148 is coupled to cassette switch 48 and is adapted to supply a reset pulse to the reset input R of EOT flip-flop circuit 142 in the event that the cassette switch is closed. Thus, if the tape supply of a cassette is exhausted, it is expected that this cassette will be removed from cassette compartment 20 of the dictation unit, thereby opening cassette switch 48. When a fresh cassette is loaded into the dictation unit, the cassette switch is closed to trigger monostable multivibrator 148 which, in turn, resets EOT flip-flop circuit 142.

The output of AND gate 160 additionally is connected to an input of reset OR gate 128 for the purpose of resetting line seize flip-flop circuit 54 in the event that telephone switch 46 is opened while telephone line 16 is seized.

AND gate 152 also is connected to an input of reset OR gate 128 and, additionally, is connected, in common, to the reset input of cue signal counter 92, to the reset inputs R of call flip-flop circuit 100, no-voice flip-flop circuit 104 and rewind flip-flop circuit 124, as well as to the reset inputs R of go-ahead flip-flop circuit 70 and record flip-flop circuit 80 via OR gates 77 and 114, respectively. It is seen, therefore, that the output of AND gate 152 is connected in common with the 1 output of stop flip-flop circuit 126.

The operation of the apparatus represented by the logic circuit diagram of FIGS. 2A and 2B now will be described. Let it be assumed that the user of dictation unit 10 wishes to use this unit as a telephone-answering device. For this purpose, a fresh cassette 22 desirably is loaded into cassette compartment 20 and then hand-held microphone unit 12 is operated so as to record an announcement message on a predetermined portion of the tape which is housed within the cassette. Advantageously, this predetermined portion is a beginning portion of the tape. The announcement message may be of a predetermined length, for example, 15 seconds, or, preferably, the announcement message may be of any desired length, the actual length thereof being represented by the count of an announce length counter, which count represents the duration of the announcement message.

After recording and verifying the announcement message, the user operates announce length switch 42, and then effects the rewinding of the tape to the beginning of that message. As the tape is rewound, the count of the announce length counter is incremented until the beginning of the tape is reached. At that time, the announce length count, which may be a count of chopper pulses (mentioned above), is a representation of the actual length of the announcement message. Then, in order to condition dictation unit 10 to operate as a telephone-answering device, telephone control switch TEL on dictation unit 10 is operated. With reference to FIG. 2A, this results in producing the TEL-ANS signal to set telephone answering flip-flop circuit 58 to its set state; and in closing telephone switch 46. Since cassette 22 is loaded into cassette compartment 20, cassette switch 48 is closed, and it also is assumed that, at this time, EOT flip-flop circuit 142 exhibits its reset state. Advantageously, farthest advance counter 93 also may be reset by the closure of the cassette switch. Hence, the illustrated apparatus is in its quiescent state and AND gate 52 is enabled to respond to a detected telephone ringing signal.

When a calling party calls the telephone station to which telephone adapter 14 is connected, an incoming ringing signal is received over telephone line 16. This ringing signal is detected by ring detector 50 which, in turn, supplies a binary "1" to enabled AND gate 52. Consequently, this AND gate is energized to set line seize flip-flop circuit 54. When triggered to its set state, the line seize flip-flop circuit actuates line seize circuit 56; whereupon telephone line 16 is seized. Thus, the incoming telephone call is "answered". If desired, ring detector 50 may respond to the incoming ringing signal after two, three or any desired number of "rings". For example, the first incoming telephone call may be "answered" after four "rings" and all subsequent incoming telephone calls may be answered after two "rings". If the telephone-answering feature of this invention exhibits a so-called remote retrieval capability, as is preferred, the user will be apprised of the existence of recorded incoming messages merely by perceiving that his incoming telephone call is answered after only two rings.

In its set state, line seize flip-flop circuit 54 enables AND gates 60, 68, 152 and 160. At this time, since it is assumed that telephone switch 46 and cassette switch 48 are closed, neither of AND gates 152 and 160 is energized. Furthermore, since telephone answering flip-flop circuit 58 is in its set state, only AND gate 60 is energized by the setting of the line seize flip-flop circuit. Accordingly, playback circuit 62 is actuated so as to reproduce, or playback, the previously recorded announcement message. As the tape is advanced, chopper pulses are generated and supplied to input terminal 91 to be counted by tape length counter 92. At the completion of this announcement message, the count of the tape length counter is equal to the announce length count, whereupon an output pulse is produced by the playback circuit. This output pulse is supplied, in common, to AND gates 64 and 86.

For the purpose of the present discussion, it is assumed that the presently described incoming telephone call is the first such call to be received. Hence, the count of call counter 63 is equal to zero. As an example, the count of this call counter may be reset whenever telephone control switch TEL is deactuated. When the count of call counter 63 is equal to zero, AND gate 64 is enabled to respond to the output pulse produced by playback circuit 62. This output pulse is supplied through OR gate 66 to the set input S of go-ahead flip-flop circuit 70, thereby setting this flip-flop circuit. As a result thereof, go-ahead tone generator 72 is actuated to transmit the go-ahead sign, which may be a predetermined tone signal, to the calling party via telephone line 16. This go-ahead signal apprises the calling party to begin his message. As may be expected, the caller's telephone message will be transmitted at the conclusion of this go-ahead signal.

At the conclusion of the go-ahead signal, a pulse is supplied from go-ahead tone generator 72 to go-ahead monostable multivibrator 76 via OR gate 74. The go-ahead monostable multivibrator generates a pulse of predetermined duration, which pulse is supplied to the reset input R of go-ahead flip-flop circuit 70 by OR gate 77, and also to AND gates 78 and 106. The go-ahead flip-flop circuit is reset to await further action, as will be described.

At the beginning of an incoming telephone call, no-voice flip-flop circuit exhibits its reset state so as to enable AND gate 78 and inhibit AND gate 106. Consequently, the pulse produced by go-ahead monostable multivibrator 76 energizes AND gate 78 to set record flip-flop circuit 80 and, additionally, to enable voice detector 96 to detect an incoming voice signal received from telephone line 16 and to energize voice timer 98. The setting of record flip-flop circuit 80 actuates record circuit 82 to initiate a message record operation. It will be appreciated that the record circuit is actuated, that is, a record operation is carried out, as long as the record flip-flop circuit exhibits its set state.

Voice detector 96, enabled by AND gate 78, detects incoming voice signals which are received from the calling party via telephone line 16. The voice detector produces an output signal in response to detected voice signals so as to trigger call flip-flop circuit 100 to its set state and, moreover, to reset voice timer 98. In its set state, call flip-flop circuit 100 enables AND gate 102 and also enables AND gate 110. That is, in response to detected voice signals, call counter 63 is conditioned to have its count incremented and cue signal generator 112 is conditioned to generate a cue signal.

Voice timer 98, after being energized, commences a time-out operation. This time-out operation is reset whenever voice signals are detected. In the absence of voice signals for a predetermined time, for example, in the absence of voice signals for fifteen seconds, voice timer 98 times out to trigger no-voice flip-flop circuit 104 to its set state and, moreover, to trigger go-ahead flip-flop circuit 70 to its set state via OR gate 66. It may be recognized, therefore, that voice timer 98 times out at the completion of an incoming telephone call.

When go-ahead flip-flop circuit 70 is triggered to its set state, go-ahead signal generator 72 is actuated, as described previously. Consequently, the go-ahead signal once again is transmitted over telephone line 16, and now apprises the calling party if he still is in communication with dictation unit 10, that telephone line 16 will be released. At the completion of the go-ahead signal, go-ahead monostable multivibrator 76 is actuated; and since AND gate 106 now is enabled by no-voice flip-flop circuit 104, this AND gate is energized to supply a pulse through OR gates 108 and 130 to AND gate 102 and to reset OR gate 128.

The pulse supplied to the reset OR gate serves to reset line seize flip-flop circuit 54. Consequently, line seize circuit 56 is deactuated, and telephone line 16 is released. Furthermore, the pulse supplied through OR gate 108 is applied to AND gate 110 which, at this time, also is supplied with a binary "1" from each of record flip-flop circuit 80 and call flip-flop circuit 100. AND gate 110 thus is energized to actuate cue signal generator 112. Consequently, the cue signal generated by this cue signal generator is recorded on the magnetic tape immediately following the recorded incoming telephone message. At the completion of this cue signal, an output pulse is supplied from cue signal generator 112 to the reset input R of record flip-flop circuit 80 by OR gate 114, to AND gate 95, and also to AND gate 118 by OR gate 116.

The pulse supplied to the reset input R of the record flip-flop circuit 80 serves to reset this flip-flop circuit and deactuate record circuit 82. This terminates the message recording operation. Also, the pulse supplied to AND gate 118 from cue signal generator 112 energizes this AND gate, which had been enabled in response to the set rewind flip-flop circuit 120. As a consequence thereof, rewind circuit 122 is actuated to rewind the magnetic tape back to the beginning of the pre-recorded announcement message. Furthermore, the pulse supplied to AND gate 95 energizes the AND gate to transfer the count of tape length counter 92 (which had been incremented by the chopper pulses produced during the message recording operation) to farthest advance counter 93. Hence, the count of the farthest advance counter now represents the farthest advance point of the tape, which also represents the next available recording portion thereon for the recording of the next incoming message.

In addition to all of the foregoing, the pulse supplied by OR gates 108 and 130 energizes AND gate 102, which had been enabled by the set state of call flip-flop circuit 100. The energization of AND gate 102 increments the count of call counter 63 by a single count. Numerical display 44 of adapter 14 (FIG. 1) illustrates the count of call counter 63. Since it has been assumed that the aforedescribed operation has been carried out in response to the first incoming telephone call, numerical display 44 displays the count of 01.

When the magnetic tape is rewound to the beginning end thereof, this condition is sensed by suitable end-of-tape detecting circuitry included in dictation unit 10 (which circuitry may be of the type described in U.S. Pat. No. 4,099,209) to produce the EOT signal. This EOT signal is supplied, from input terminal 132 to AND gates 124 and 138. During the rewind operation, AND gate 138 is disabled. However, AND gate 124 is enabled in response to the set state of rewind flip-flop circuit 120 so as to be energized by the EOT signal and to set stop flip-flop circuit 126. When set, the stop flip-flop circuit resets rewind flip-flop circuit 120, no-voice flip-flop circuit 104 and call flip-flop circuit 100. Tape length counter 92 also is reset thereby. The illustrated logic circuit thus assumes its quiescent condition to await the next incoming telephone call.

To summarize, when in the telephone-answering mode of operation, line seize circuit 56 is actuated to seize telephone line 16 in response to an incoming telephone ringing signal. Then, playback circuit 62 is actuated to reproduce the pre-recorded announcement message. At the completion of this announcement message, go-ahead signal generator 72 is actuated to transmit a go-ahead signal to the calling party, apprising him to commence his message. Also, record circuit 82 is actuated to initiate a message-recording operation. The presence of an incoming message is detected by voice detector 96, which sets call flip-flop circuit 100 to condition AND gate 102 to implement the count of call counter 63 at the completion of the incoming telephone call. The set state of the call flip-flop circuit also conditions AND gate 110 to actuate cue signal generator 112 at the completion of the telephone call. When the telephone call is completed, as detected by the absence of voice signals for the predetermined time-out period of voice timer 98, no-voice flip-flop circuit 104 is triggered to its set state, whereupon the count of call counter 63 is incremented, cue signal generator 112 is actuated to record a cue signal on the magnetic tape and rewind flip-flop circuit 120 is set to actuate rewind circuit 122. Thus, the magnetic tape, after the cue signal is recorded thereon, is returned to the beginning of the pre-recorded announcement message. When the beginning of the magnetic tape is reached, stop flip-flop circuit 126 is set to reset the illustrated logic circuit to its quiescent condition. The stop flip-flop circuit itself may be reset at a delayed time following the assumption of this quiescent condition.

If an incoming message is not transmitted by the calling party, voice detector 96 does not set call flip-flop circuit 100. Hence, when voice timer 98 times out, thus representing the completion of the incoming telephone call, call counter 63 is not incremented because AND gate 102 had not been enabled. Also, cue signal generator 112 is not actuated because AND gate 110 had not been enabled. Thus, in the absence of an actual incoming message, a cue signal is not recorded, the call counter is not incremented and farthest advance counter 93 is not updated. Nevertheless, rewind flip-flop circuit 120 is set and the magnetic tape is rewound to the beginning of the pre-recorded announcement message.

Let it be assumed that, after transmitting his message, the calling party hangs up. In most telephone systems, this release of the telephone line by the calling party results in a CPC signal supplied to input terminal 134. This CPC signal is applied prior to the timing out of voice timer 98. Nevertheless, this CPC signal is supplied, from OR gate 108, to AND gate 110 so as to actuate cue signal generator 112. Furthermore, the CPC signal is supplied from OR gate 108 through OR gate 130 to energize AND gate 102, thereby incrementing the count of call counter 63. Still further, this CPC signal also is supplied to reset OR gate 128 to reset line seize flip-flop circuit 54, thereby deactuating line seize circuit 56, whereupon telephone adapter 14 (FIG. 1) releases telephone line 16. As before, upon the completion of the recording of the cue signal generated by cue signal generator 112, AND gate 95 is energized to transfer the tape length count to farthest advance counter 93 and AND gate 118 is energized to set rewind flip-flop circuit 120, whereupon the magnetic tape is rewound to the beginning of the pre-recorded announcement message. When the beginning of the tape is reached, the EOT signal is produced to energize AND gate 124, whereby stop flip-flop circuit 126 is triggered to its set state to return the illustrated apparatus to its quiescent condition.

Let it now be assumed that, after an incoming telephone message has been recorded, another incoming telephone call is received. As was described above, ring detector 50 detects the incoming telephone ringing signal to energize AND gate 52 so as to set line seize flip-flop circuit 54. Line seize circuit 56 is actuated to seize telephone line 16 and thereby "answer" the incoming telephone call. Also, AND gate 60 is energized to actuate playback circuit 62, whereupon the pre-recorded announcement message is reproduced and transmitted to the calling party.

At the completion of the announcement message, playback circuit 62 supplies an output pulse to AND gates 64 and 86. Since the count of call counter 63 now is assumed to be, for example, 1, AND gate 64 is disabled and AND gate 86 is enabled. This latter AND gate actuates fast forward circuit 88 to advance the magnetic tape rapidly. While the fast forward circuit is actuated, fast forward tone generator 90 also is actuated to transmit the fast-forward tone signal over telephone line 16 to the calling party. This fast forward tone signal serves the same purpose as the aforedescribed go-ahead tone signal, that is, to apprise the calling party to transmit his message at the completion thereof. While the magnetic tape is advanced during this fast forward operation, chopper pulses are produced and supplied to input terminal 91. Each chopper pulse increments tape length counter 92. The count of this tape length is compared by comparator 94 to the count stored in farthest advance counter 93. When these counts are equal, that is, when the tape has been advanced to its farthest advance point, comparator 94 supplies a stop signal to fast forward circuit 88. Consequently, the fast forward circuit is deactuated to terminate the fast forward operation. At the completion of this fast forward operation, the fast forward tone terminates and fast forward tone generator 90 supplies a pulse through OR gate 74 to trigger go-ahead monostable multivibrator 76. As was described previously, go-ahead monostable multivibrator 76 produces a pulse which energizes AND gate 78 to set record flip-flop circuit 80, thereby initiating the message-recording operation. The incoming message received from the calling party via telephone line 16 now is recorded on the magnetic tape housed within cassette 22.

It is appreciated, therefore, that the combination of farthest advance counter 93, AND gates 64 and 86, fast forward circuit 88, tape length counter 92 and comparator 94 serve to advance the magnetic tape from the completion of the pre-recorded announcement message until the next available recording portion of the tape is reached. That is, all of the previously recorded incoming messages are passed over until a "fresh" portion of the tape is reached, at which point the message-recording operation begins. At the completion of this message, as was discussed above, the cue signal is recorded, the count of farthest advance counter 93 is updated, the count of call counter 63 is incremented and then the tape is rewound to the beginning of the pre-recorded announcement message. As call counter 63 is incremented, numerical display 44 (FIG. 1) likewise is updated to display the total number of incoming telephone messages which have been recorded on cassette 22.

The foregoing operation is repeated for each incoming telephone call, whereby incoming messages are recorded, in sequence, on the magnetic tape. Hence, when the user of dictation unit 10 wishes to listen to all incoming messages which have been recorded in his absence, the number of which messages are displayed on numerical display 44, he merely plays back the recorded tape.

Let it be assumed that the length of an incoming telephone message is sufficiently long that, during the recording thereof, all of the magnetic tape is exhausted. When the end of tape of reached, the EOT signal is produced by suitable circuitry included in dictation unit 10, and this EOT signal is supplied to input terminal 132. Since a message-recording operation is in progress, it is appreciated that record flip-flop circuit 80 exhibits its set state. Consequently, a binary "1" is supplied to one input of AND gate 138 from the 1 output of record flip-flop circuit 80 via connection terminal 133, and the EOT signal is supplied as a binary "1" to the other input of this AND gate. AND gate 138 is energized to trigger EOT flip-flop circuit 142 to its set state via OR gate 140. The set states of record flip-flop circuit 80 and EOT flip-flop circuit 142 energize AND gate 162 to trigger EOT pulse generator 164. When this EOT pulse generator is triggered, EOT signal generator 166 is actuated to generate the warning tone representing that the end-of-tape has been reached. This warning tone is transmitted to the calling party via telephone line 16 to warn him that the remainder of his message will not be recorded. This warning signal also is present as an audible signal to warn an individual in the vicinity of dictation unit 10 that the supply of recording tape therein has been exhausted.

After a predetermined number of pulses (e.g. ten) have been produced, EOT pulse generator supplies an output pulse to OR gates 114, 116 and 130. Also, EOT tone generator 166 is deactuated. The pulse supplied to OR gate 114 resets record flip-flop circuit 80, thereby terminating the message-recording operation. The pulse supplied to OR gate 116 energizes AND gate 118 to set rewind flip-flop circuit 120, whereupon a rewind operation is carried out, thereby returning the magnetic tape to the beginning of the pre-recorded announcement message. The pulse supplied to OR gate 130 energizes AND gate 102 to increment the count of call counter 63; and also to trigger reset OR gate 128 to reset line seize flip-flop circuit 54. Of course, since the usable portion of the magnetic tape has been exhausted, a cue signal is not recorded thereon.

After the magnetic tape is returned to the beginning of the pre-recorded announcement message, stop flip-flop circuit 126 is set in accordance with the operation described hereinabove. This tends to place the illustrated logic circuit in its quiescent condition, except that EOT flip-flop circuit 142 remains in its set state. Because of this, AND gate 52 is inhibited from responding to the next incoming telephone call and, therefore, line seize flip-flop circuit 54 will not be set. That is, the illustrated apparatus will not respond to, or "answer" subsequent telephone calls because there is no available magnetic tape upon which additional incoming messages can be recorded. However, when a fresh cassette is loaded into dictation unit 10, the opening and closing of cassette switch 48 triggers monostable multivibrator 148 to reset EOT flip-flop circuit 142, thereby enabling AND gate 52 to respond to subsequent incoming telephone calls. Although not shown, the triggering of monostable multivibrator 148 in response to the closing of cassette switch 48 also is used to reset the count of farthest advance counter 93 to zero.

Let it now be assumed that, during the recording of an incoming telephone message, the magnetic tape is advanced during the message-recording operation, into the so-called "end zone". This means that less than a predetermined amount of magnetic tape is available for recording a subsequent telephone message, although the total supply of magnetic tape has not yet been exhausted. For example, if less than two minutes of message-recording time remains on the tape, it is assumed that the tape has entered its "end zone". When this occurs, an end zone signal is produced by suitable circuitry included within dictation unit 10, and this end zone signal is supplied via input terminal 136 to AND gate 146. Now, prior to exhausting the magnetic tape, let it be further assumed that the telephone call is completed. The completion of this telephone call may be detected either by the combination of voice timer 98 and no-voice flip-flop circuit 104, as described above, or by a suitable detecting circuit which supplies a CPC signal to input terminal 134. In either event, OR gate 144 is energized in response to the detected completion of the telephone call to supply a binary "1" to AND gate 146. Since the end zone signal is present, AND gate 146 now is energized to trigger EOT flip-flop circuit 142 to its set state via OR gate 140. The operation which has been discussed hereinabove in response to the setting of the EOT flip-flop circuit now is carried out. It should be noted, however, that when a telephone call is completed after the magnetic tape has been advanced into its "end zone", a cue signal nevertheless is recorded because cue signal generator 112 is actuated upon sensing the completion of the incoming telephone call.

The foregoing has described the operation of the illustrated logic circuit when a telephone-answering mode of operation is carried out. Let it be assumed that the user of dictation unit 10 wishes to use this unit as a remote dictation device whereby he can transmit dictation thereto via telephone line 16. To achieve this mode of operation, announce length switch 42 is closed, but the tape is not rewound. Hence, the announce length count remains at zero, thereby producing the REM DICT signal. This disposes telephone answering flip-flop circuit 58 in its reset condition so as to enable AND gate 68 to respond to the set state of line seize flip-flop circuit 54 while disabling AND gate 60. Now, when an incoming telephone ringing signal is detected by ring detector 50 to set line seize flip-flop circuit 54, AND gate 68 is energized to set go-ahead flip-flop circuit 70 via OR gate 66. It is appreciated that, since AND gate 60 is disabled, playback circuit 62 is not actuated when the illustrated apparatus responds to an incoming telephone call.

As before, when go-ahead flip-flop circuit 70 is set, go-ahead tone generator 72 is actuated to transmit the go-ahead signal to the calling party via telephone line 16 and, upon the completion of this signal, go-ahead monostable multivibrator 76 is triggered. When this monostable multivibrator is triggered, go-ahead flip-flop circuit 70 is reset, via OR gate 77, and AND gate 78 is energized to trigger record flip-flop circuit 80 to its set state. It is recalled that AND gate 78 is energized in response to the pulse produced by go-ahead monostable multivibrator 76 because, at the beginning of an incoming telephone call, no-voice flip-flop circuit 104 exhibits its reset state.

Thus, record circuit 82 is actuated and an incoming telephone message is recorded. At the completion of the incoming telephone call, either no-voice flip-flop circuit 104 is triggered to its set state in response to the absence of voice signals for the time-out duration of voice timer 98, or a CPC signal is produced and supplied to input terminal 134. If the completion of a telephone call is detected by the timing out of voice timer 98, then the output signal produced by this voice timer triggers go-ahead flip-flop circuit 70 via OR gate 66 to actuate go-ahead tone generator 72. The go-ahead signal is transmitted once again to the calling party, thus warning him that the illustrated apparatus has detected the completion of the telephone call. At the conclusion of this go-ahead signal, go-ahead monostable multivibrator 76 is triggered once again to supply a pulse to AND gate 106. This AND gate had been enabled in response to the set state of no-voice flip-flop circuit, which had been triggered to its set state by the timing out of voice timer 98, so as to supply a pulse via OR gate 108 to AND gate 110, and to supply a pulse via OR gate 130 to AND gate 102 and also to reset OR gate 128.

If the completion of the incoming call had been represented by the CPC signal, then a suitable pulse is supplied from the input terminal 134 to OR gate 108 from which it is supplied to AND gate 110, AND gate 102 and reset OR gate 128.

AND gate 110 is energized by the pulse supplied thereto from OR gate 108 to actuate cue signal generator 112. Consequently, the cue signal is recorded on the magnetic tape following the telephone message. AND gate 102 is energized by the pulse supplied from OR gate 108 to increment the count of call counter 63. It is, of course, assumed that, in order to increment the count of the call counter, call flip-flop circuit 100 had been set by voice detector 96. The pulse supplied to reset OR gate 128 from OR gate 108 resets line seize flip-flop circuit 54 to deactuate line seize circuit 56 and release telephone line 16.

At the completion of the recording of the cue signal on the magnetic tape, cue signal generator 112 supplies a pulse through OR gate 114 to reset record flip-flop circuit 80, thereby terminating the message-recording operation. This pulse also is supplied to AND gate 113, which is enabled by the reset state exhibited by telephone answering flip-flop circuit 58, whereupon this AND gate is energized to set stop flip-flop circuit 126. The illustrated logic circuit thus assumes its quiescent condition awaiting receipt of the next incoming telephone call.

It should be appreciated that, in the remote-dictation mode, AND gate 118 is disabled by reason of the reset state of telephone answering flip-flop circuit 58. Hence, the pulse produced by cue signal generator 112 at the completion of the cue signal, although supplied to AND gate 118 via OR gate 116 fails to energize this AND gate and thus does not set rewind flip-flop circuit 120.

The operation of EOT flip-flop circuit 142, and the manner in which this flip-flop circuit responds to the EOT signal and to the end zone signal while the illustrated apparatus is in the remote-dictation mode is similar to that described hereinabove. Hence, in the interest of avoiding redundant description, this operation is not repeated.

If the illustrated logic circuit is in its telephone-answering mode or in its remote-dictation mode while exhibiting its quiescent condition, line seize circuit 56 will not be actuated if either telephone switch 46 or cassette switch 48 is opened. Thus, an incoming telephone call will not be "answered". However, if line seize circuit 56 has been actuated such that an incoming telephone call is answered, line seize flip-flop circuit 54 will be reset when either telephone switch 46 or cassette switch 48 is opened. Furthermore, when either of these switches is opened, interrupt tone generator 56 is actuated to generate an alarm tone. In addition to generating this alarm tone, if cassette switch 48 is opened while a telephone call is in progress, the illustrated flip-flop circuits (with the exception of EOT flip-flop circuit) are reset.

It may be appreciated that, if desired, various modifications may be made to the logic circuit illustrated in FIGS. 2A and 2B. For example, AND gate 106 may be omitted. In that event, the 1 output of no-voice flip-flop circuit 104 will be connected directly to a corresponding input of OR gate 108. Also, if desired, a go-ahead signal need not be transmitted to the calling party when voice timer 98 times out (detects the absence of voice signals for a predetermined time duration). In that event, there would be no need to connect the output of the voice timer to OR gate 66. Additional changes and simplifications may be effected to the illustrated logic circuit without substantial change in the functions performed thereby.

Figure 3A:
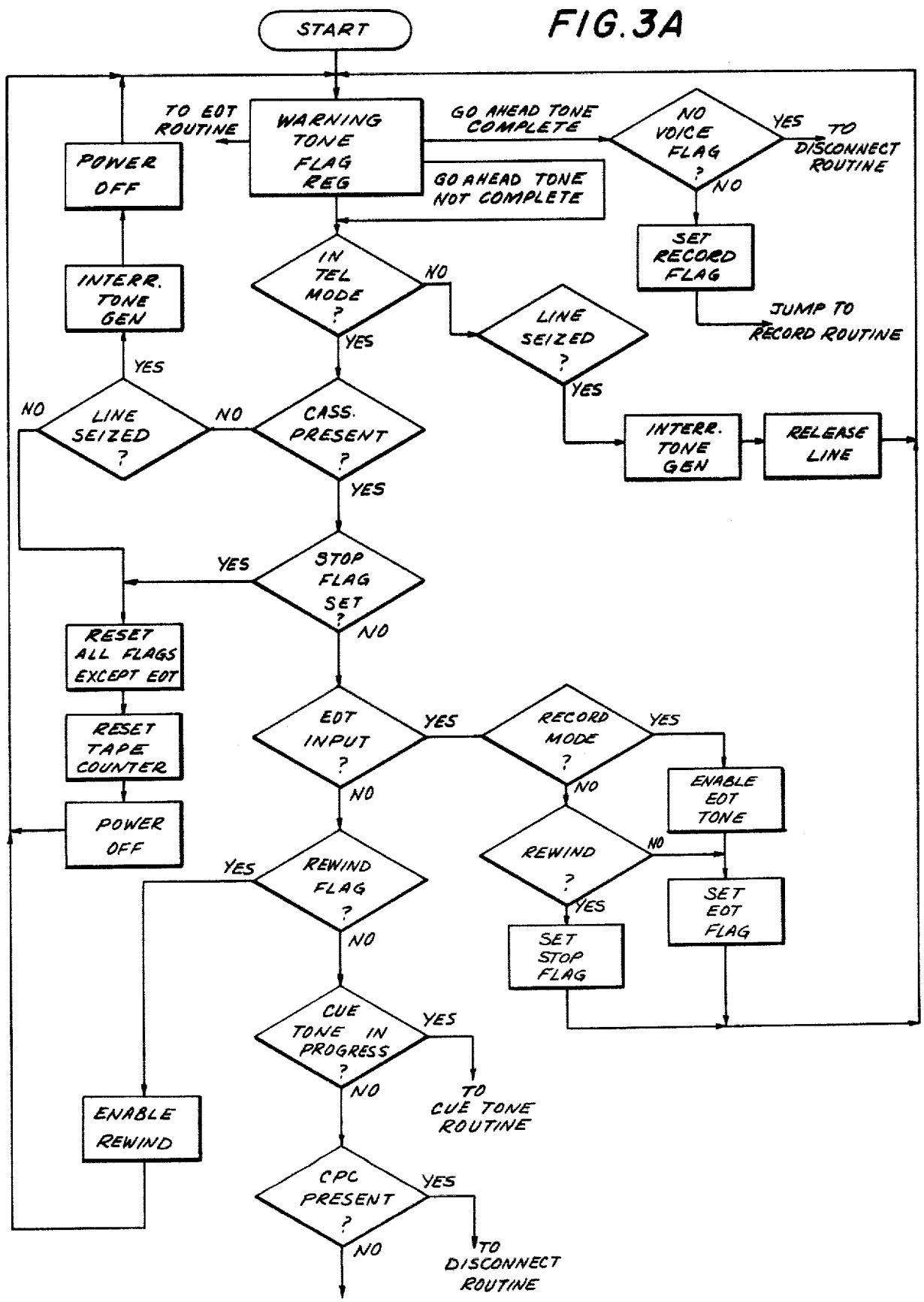
FIGS. 3A–3C are flow charts representing one embodiment of a program which can be used with a processor for implementing the present invention.
Figure 3B:
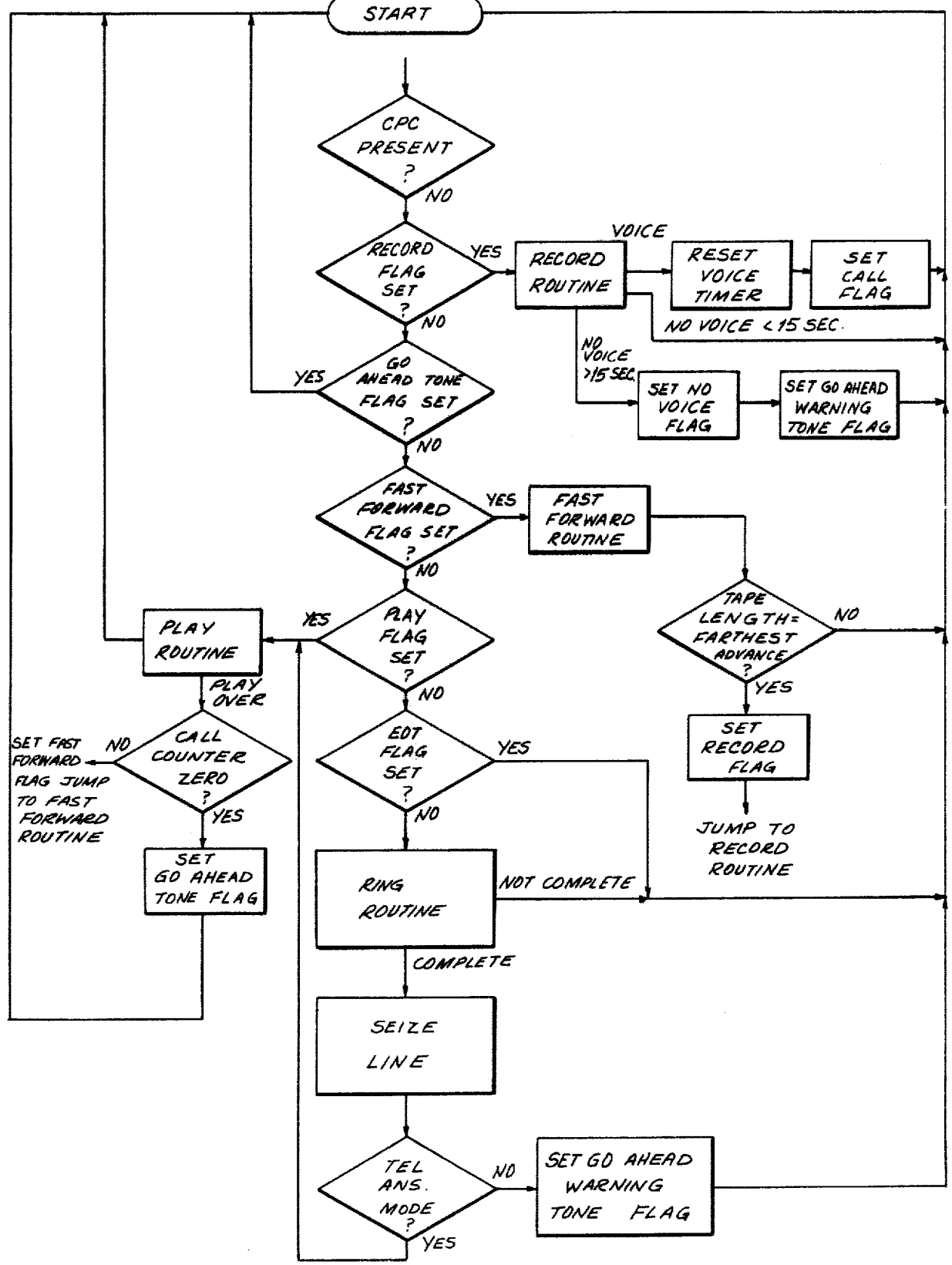
Figure 3C:
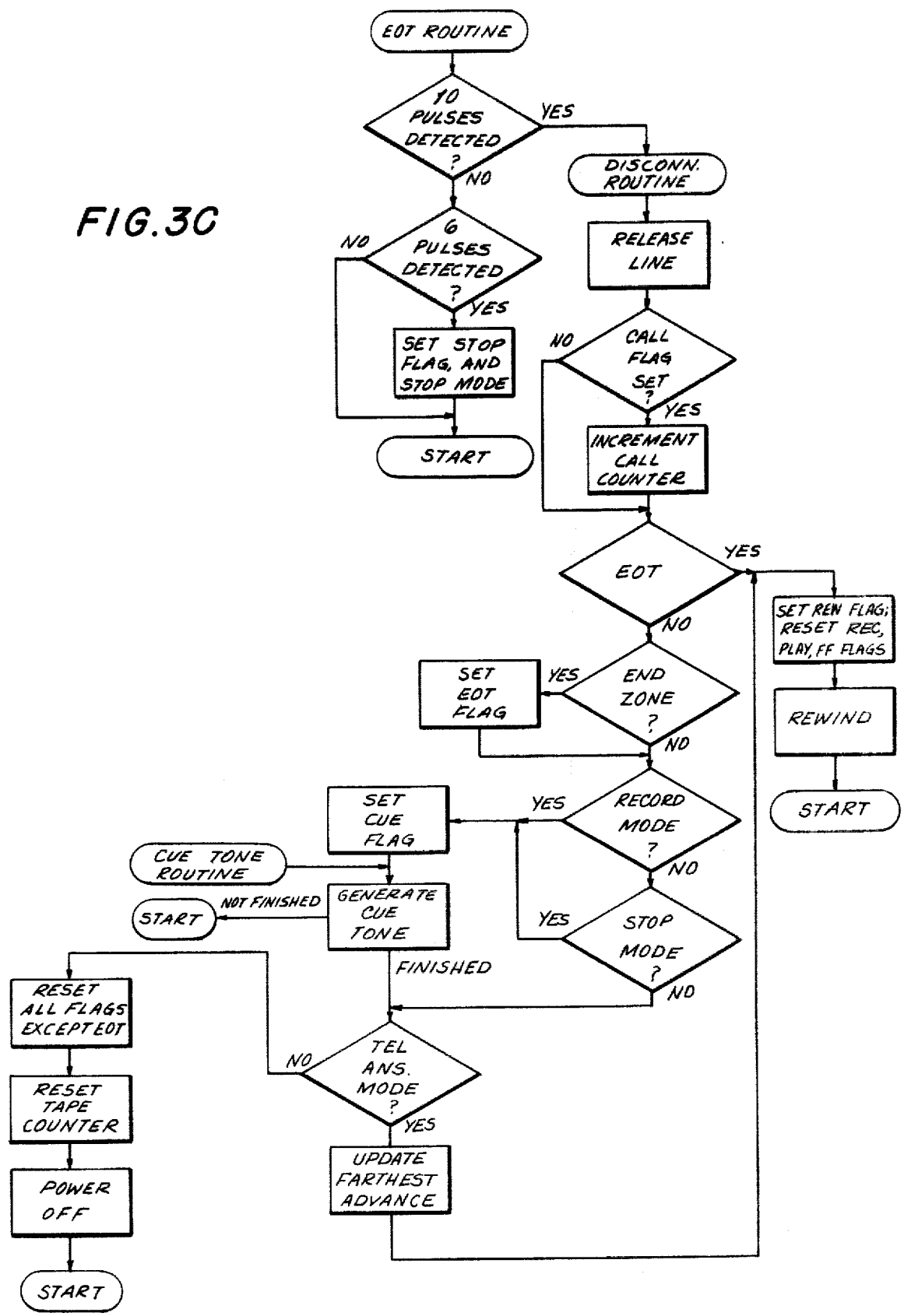

Reference now is made to the flow chart shown in FIGS. 3A-3C, which flow chart represents a particular program for a processor, such as a micro-processor, which can be used to implement the functions carried out by the logic circuit illustrated in FIGS. 2A and 2B. In accordance with current technology and the relative costs of constructing and utilizing a micro-processor, it may be preferred to implement the logic circuit of FIGS. 2A and 2B in a specially programmed micro-processor. It will be appreciated that the particular mechanics of programming such a micro-processor will be fully understood and easily carried out by one of ordinary skill in the art in accordance with the description of the flow chart shown in FIGS. 3A to 3C.

Turning now to the illustrated flow chart, the program commences at START and proceeds to a warning tone flag register where the presence of an EOT flag signal or a go-ahead flag signal are detected. Let it be assumed, initially, that neither of these flag signals is present in the warning tone flag register. The program then proceeds to inquire whether dictation unit 10 is disposed in its telephone mode, that is, whether the telephone selector switch TEL has been actuated. If the dictation unit is in its telephone mode, the program continues, and inquires whether a cassette 22 is loaded into cassette compartment 20. If, however, it is determined that dictation unit 10 is not in its telephone mode, then the program inquires as to whether telephone line 16 has been seized. If this line has been seized, the interrupt tone generator is actuated, the telephone line is released and the program routine returns to START.

With respect to the inquiry as to whether a cassette is present, if not, the program inquires as to whether the telephone line has been seized. If it has, that is, if the telephone line has been seized but no cassette is present, the interrupt tone generator is actuated, the power supply is interrupted (i.e. a power-off mode is initiated) and the program routine returns to START. However, if the telephone line has not been seized and if a cassette is not present, then all flag signals are reset, except the EOT flag signal, the tape length counter is reset, power is interrupted and the program routine returns to START.

If the inquiry as to whether a cassette is present is answered in the affirmative, the program continues to inquire whether the stop flag signal has been set. If so, then all flags, except the EOT flag, are reset, the tape length counter is reset, the power-off quiescent mode is initiated and the routine returns to START. However, if the stop flag has not been set, then the program continues and inquires as to whether an EOT input signal is present. If this EOT signal is present, the program inquires as to whether dictation unit 10 is in its record mode. If so, then the EOT tone generator is triggered, an EOT flag signal is set in the warning tone flag register, and the program routine returns to START. However, if the EOT input signal is present but dictation unit 10 is not in its record mode, then the program continues and inquires as to whether dictation unit 10 is in its rewind mode. If not, then the EOT flag is set in the warning tone flag register and the routine returns to START. However, if the EOT input signal is present and the dictation unit is in its rewind mode, then the stop flag is set and the routine returns to START.

If the answer to the inquiry of whether the EOT input signal is present is in the negative, then the program continues and inquires as to whether the rewind flag is set. If it is, then the rewind operation is enabled and the routine returns to START. However, if the rewind flag is not set, then the program advances to inquire whether a cue tone is in progress, that is, whether a cue tone is being generated and recorded. If the answer to this inquiry is in the affirmative, then the program jumps to the cue tone routine, shown in FIG. 3C, and described below. If, however, the cue tone is not in progress, then the program advances and inquires whether a CPC signal is present. If this CPC is present, the program jumps to the disconnect routine, described in greater detail below with respect to FIG. 3C.

If, however, the CPC signal is not present, then as shown in FIG. 3B, the program advances to inquire whether the record flag is set. If this flag has been set, then the record routine is carried out. In this record routine, voice is detected to reset the voice timer. If this timer has been reset, that is, if a voice signal has been detected, then the call flag is set. However, if no voice has been detected, and this condition subsists for less than 15 seconds, the routine returns to START. During this record routine, if no voice signals are detected for more than 15 seconds, irrespective of whether the voice timer had been reset in response to a voice signal, the no-voice flag is set and the go-ahead warning tone flag is set in warning tone flag register. The routine then returns to START.

If the inquiry as to whether the record flag had been set is negative, the program advances to inquire whether the go-ahead tone flag is set in the warning tone flag register. If it has been set, the routine returns to START. If, however, the go-ahead tone flag has not been set, the program advances to inquire whether the fast forward flag is set. If so, the fast forward operation is initiated and the count of the tape length counter is compared to the count of the farthest advance counter. If these counts are not equal, the routine returns to START. However, if these counts are equal, the record flag is set and the program jumps to the aforedescribed record routine.

If the fast forward flag had not been set, the program advances to inquire whether the play flag has been set, that is, whether a playback mode is to be established. If this flag has been set, the play routine is carried out, whereupon the pre-recorded announcement message is reproduced. This play routine continues until the completion of the pre-recorded announcement message. At that time, the program inquires whether the count of the call counter is zero, that is, whether the telephone call then in progress is the first call. If the count is zero, then the go-ahead tone flag is set in the warning tone flag register, and the routine returned to START. However, if the count of the call counter is not zero, that is, if the telephone call in progress is not the first call, then the fast forward flag is set and the program jumps to the aforedescribed fast forward routine.

If the play flag had not been set, that is, the dictation unit is not in its playback mode, the program advances to inquire whether the EOT flag is set in the warning tone flag register. If this flag has been set, the routine returns to START. However, if the EOT flag has not been set, the program advances to the ring routine wherein an incoming ringing signal is detected. If this ring routine is not completed, the program routine returns to START. For example, if the incoming telephone call is to be answered only after detecting the second incoming ringing signal, and this second ringing signal has not yet been detected, the program routine returns to START. If this ring routine is completed, that is, if the second ringing signal has been detected, then the telephone line is seized and the program advances to the inquiry of whether telephone adapter 14 admits of its telephone-answering mode. If the telephone adapter is not in its telephone-answering mode, it is assumed that the adapter is in its remote-dictation mode, and the go-ahead warning tone flag is set in the warning tone flag register, and the routine returns to START. If, however, the adapter is in its telephone-answering mode, then the play routine, described above, is carried out.

If an EOT flag is set in the warning tone flag register, then the EOT routine is carried out, this routine being represented in FIG. 3C. A pulse generator, similar to EOT pulse generator 164, is actuated at the commencement of the EOT routine. If 10 pulses have not been generated by this pulse generator, an inquiry is made whether six pulses had been generated thereby. If not, the routine returns to START and advances to the warning tone flag register wherein the EOT flag has been set and the EOT routine is continued. If the EOT pulse generator has generated 6 pulses, then the stop flag is set and the stop mode for the dictation unit is initiated. The routine then returns to START and proceeds to the EOT routine because the EOT flag still is set in the warning tone flag register. Again the inquiry is made as to whether the EOT pulse generator has generated 10 pulses. If so, the disconnect routine is carried out.

The disconnect routine, as represented by the flow chart shown in FIG. 3C, releases the telephone line and then inquires whether the call flag has been set. It may be recalled that the call flag is set when voice signals are detected in the record routine (FIG. 3B). If the call flag has been set, the call counter is incremented and then an inquiry is made as to whether the EOT signal is present. If the call flag had not been set, then the program advances directly to this inquiry.

If the EOT signal is present, then the rewind flag is set and the record, play and fast forward flags all are reset. After the rewind flag is set, the rewind operation is carried out and the routine returns to START.

If the EOT signal is not present, then the program advances to inquire whether the end zone signal is present. If so, the EOT flag is set and then the program advances to inquire whether the dictation unit is in its record mode. If the end zone signal is not present, then this inquiry is made directly. If the dictation unit is in its record mode, then the cue flag is set and the cue tone routine is carried out. In this routine, the cue tone signal is generated for recording. It is recalled that the cue tone signal is of predetermined duration. If this signal has not been completed, the routine returns to START. However, if the cue tone signal is completed, an inquiry is made as to whether telephone adapter 14 is in its telephone answering mode. If it is, then the program advances to update the farthest advance counter and set the rewind flag so as to initiate the rewind operation. If the adapter is not in its telephone answering mode, that is, if the adapter is in its remote-dictation mode, all flags, except the EOT flag, are reset, the tape length counter is reset and the apparatus is disposed in its power-off mode. The routine then returns to START.

Returning to the inquiry of whether dictation unit 10 is in its record mode, if not, the inquiry is made as to whether the dictation unit is in its stop mode. If so, the cue flag is set and the aforementioned cue tone routine is carried out. However, if the dictation unit is not in its stop mode, the inquiry is made as to whether adapter 14 is in its telephone-answering mode or its remote-dictation mode. This inquiry has been discussed above.

The operation of the program illustrated in the flow chart of FIGS. 3A-3C now will be described in conjunction with an incoming telephone call. Initially, let it be assumed that no flags are set in the warning tone flag register, that all other flags are reset, and that an announcement message has been recorded at a predetermined portion of the magnetic tape. At the START of the routine, the contents of the warning tone flag register are examined. Since no warning tone flags are present, the inquiry is made as to whether dictation unit 10 is in its telephone mode. It is assumed that the dictation unit is, indeed, in its telephone mode, that a cassette is present, and that a stop flag has not been set. It is further assumed, since the dictation unit and telephone adapter are in their quiescent conditions, that an EOT signal is not present, that a rewind flag has not been set and that a cue tone is not in progress. Furthermore, in the quiescent condition, a CPC signal is not present, a record flag is not set and the go-ahead tone flag is not set. Also, since the quiescent condition has been assumed, the fast forward flag is not set, the play flag is not set and the EOT flag is not set. This brings the program to the ring routine. If an incoming ring signal is not detected, the program exists from the ring routine, returns to START, and follows the same path discussed above. Let it be assumed that an incoming ringing signal is detected. The program thus advances, step-by-step, to the ring routine. If this routine is not completed, for example, if the predetermined number of telephone ringing signals has not been detected, the program remains in the loop from START to the ring routine.

Now, let it be assumed that the ring routine is completed. That is, it is assumed that the predetermined number of telephone ringing signals has been detected. The telephone line is seized and the program advances to inquire whether the adapter is in its telephone answering mode. It is assumed, for this discussion, that the adapter is in its telephone answering mode. The play routine now is commenced, and the play flag is set. As the pre-recorded announcement message is played back, the program exits from the play routine to START and then commences, step-by-step, through the warning tone flag register, where it has been assumed that neither the EOT flag nor the go-ahead tone flag have been set, to make the successive inquiries discussed above. In response to these inquiries, it is appreciated that dictation unit 10 is in its telephone mode, that a cassette is present, that the stop flag has not been set, that the EOT signal is not present, that the rewind flag has not been set, that a cue tone is not in progress, that a CPC signal is not present, that a record flag is not set, that the go-ahead tone flag is not set and that the fast forward flag is not set. However, since the dictation unit is in its play routine, the play flag is set and the program exits from the inquiry as to whether the play flag is set into the play routine. Hence, during this play routine, the program remains in the loop from START to the play routine. Once the pre-recorded telephone message is completed, the play routine is over and the inquiry is made as to whether the call counter is zero, that is, whether the telephone call in progress is the first telephone call.

If the count of the call counter is zero, the go-ahead tone flag is set in the warning tone flag register, and the routine returns to START. Now, the program senses that the go-ahead tone flag is set in the warning tone flag register and the go-ahead tone is generated. While the go-ahead tone is in progress, the program exits from the warning tone flag register and then progresses step-by-step through the aforedescribed chain of inquiries. That is, the dictation unit is in its telephone mode, a cassette is present, the stop flag is not set, the EOT signal is not present, the rewind flag is not set, the cue tone is not in progress, the CPC signal is not present, the record flag is not set, but the go-ahead tone flag is set. Hence, until the go-ahead tone is completed, the program remains in the loop from START to the inquiry as to whether the go-ahead tone flag is set.

Once the go-ahead tone is completed, the program exists from the warning tone flag register to inquire whether the no-voice flag is set. Since the incoming message has not yet commenced, it is assumed that the no-voice flag is not present and, in accordance with the program, the record flag is set and the program jumps to the record routine.

In the record routine, if no voice signals are detected for less than 15 seconds, the program remains in the loop from START, through the warning tone flag register, and then through the successive chain of inquiries until reaching the inquiry of whether the record flag is set. Since this flag is set, the record routine is carried out, resulting in the loop from the record routine to START. When a voice signal is detected, the voice timer is reset and the call flag is set. Nevertheless, the program remains in this loop from the record routine to START until, finally, the telephone call has been completed. That is, once the voice timer detects no voice signals for more than 15 seconds, the program exits from the record routine to set the no-voice flag and also to set the go-ahead warning tone flag. The routine then returns to START.

At this time, the go-ahead warning tone flag again is set in the warning tone flag register, the no-voice flag is set, the call flag is set and the record flag is reset. Since the go-ahead tone is in progress, the program exits from the warning tone flag register to inquire whether dictation unit 10 is in its telephone mode. It is appreciated that, at this stage, the dictation unit is in its telephone mode, a cassette is present, the stop flag is not set, an EOT signal is not present, the rewind flag is not set, the cue tone is not in progress, the CPC signal is not present, the record flag is not set, but the go-ahead tone flag is set. Hence, the program remains in the loop from START to the inquiry of whether the go-ahead tone flag is set until the go-ahead tone is completed. At that time, the inquiry is made whether the no-voice flag is set. It has been assumed that, in exiting from the record routine, the no-voice flag has been set. Hence, the program now jumps to the disconnect routine, shown in FIG. 3C.

In this routine, the telephone line is released and an inquiry is made as to whether the call flag has been set. It has been assumed hereinabove that voice signals have been detected on the telephone line and, therefore, that the call flag had been set. Consequently, the count of the call counter is incremented. Next, an inquiry is made as to whether the EOT signal is present. It is assumed that this signal is not present and, moreover, that the magnetic tape has not yet been advanced into its end zone. It is further assumed that, although the record flag has been reset the dictation unit still is in its record mode. Accordingly, and as shown in FIG. 3C, the cue flag is set and the cue tone routine is carried out. In accordance with this routine, the cue tone signal is generated. If this signal is still in progress, that is, if the predetermined duration of this cue tone signal has not yet expired, the cue tone continues to be generated and recorded, and the routine returns to START.

It will be appreciated that the program now remains in the loop from START through the chain of inquiries until the inquiry as to whether the cue tone is in progress is made. Since the cue tone is in progress, the program jumps to the cue tone routine and then returns to START in the event that the cue tone signal is not completed. However, once this signal is completed, the program exits to inquire whether adapter 14 is in its telephone-answering mode and, since it has been assumed that this is the mode of operation thereof, the program continues to update the farthest advance counter to indicate the present farthest advance position, set the rewind flag and reset the record, play and fast forward flags, initiate the rewind operation, and then return the program to START. The program now remains in the loop from START, through the warning tone flag register, down to the inquiry of whether the rewind flag is set, and then to the rewind routine. This loop continues until the beginning of the magnetic tape is reached.

The EOT signal is produced when the tape is rewound to its beginning. Thus, as the program cycles in the aforementioned rewind loop, it will inquire as to whether the EOT signal is present. When the beginning of the tape is reached, the presence of the EOT signal results in an exit from the rewind loop and, since the dictation unit is not in its record mode but is in its rewind mode, the stop flag is set and the program routine returns to START.

The program now continues from START, through the warning tone flag register and, since the dictation unit is in its telephone mode, a cassette is present and the stop flag has been set, exits to reset all flags, except the EOT flag (which had not been set). The tape length counter is reset and the apparatus is disposed in its power-off mode, or quiescent condition, awaiting receipt of the next incoming telephone call.

It is appreciated that, in its quiescent condition, the program remains in the loop from START, through the warning tone flag register, which is reset, and through the successive chain of inquiries until the ring routine is reached. In the absence of an incoming signal, it is assumed that the ring routine is not complete, and the program returns to START. This loop remains until the next incoming telephone call is received. Once the ring routine has been completed, that is, the predetermined number of telephone ringing signals has been detected, the telephone line is seized and, since adapter 14 is in its telephone-answering mode, the play routine is initiated and the play flag is set.

The program now remains in the loop from the play routine, to START, through the warning tone flag register, through the successive inquiries until the inquiry as to whether the play flag is set. Since this flag is set, the loop through the play routine is closed.

As described above, once the pre-recorded announcement message has been played back, the aforementioned loop exits from the play routine to inquire whether the count of the call counter is zero. In the present example, it is assumed that this count is not zero. Hence, the fast forward flag is set and the fast forward routine is carried out. Thus, after the announcement message is reproduced, the tape is advanced in a fast forward operation so as to "skip" over all previously recorded telephone messages. As the tape is advanced, each chopper pulse, which is produced when the tape is driven, is detected and used to increment the tape length counter. If the count of the tape length counter is not equal to the count of the farthest advance counter, the program returns to START, and remains in the loop through the fast forward routine. However, once the tape has been advanced to the next available location upon which an incoming message can be recorded, the count of the tape length counter will be equal to the count of the farthest advance counter, and the aforementioned loop containing the fast forward routine now exits to set the record flag, and the program jumps to the record routine, discussed above.

It is recalled that, when in the record routine, if voice signals are detected on telephone line 16, the call flag is set. Furthermore, the program returns to START and remains in the loop containing the record routine until the absence of voice signals is detected for more than 15 seconds. At that time, the no-voice flag is set and the go-ahead warning tone flag is set in the warning tone flag register. The program routine then returns to START and remains in the loop from the warning tone flag register to the inquiry of whether the go-ahead tone flag is set, to return to START. Once the go-ahead tone is completed, the program exits from this loop and, since the no-voice flag is set, proceeds to the disconnect routine, described above.

Thus, it is seen that, depending upon the count of the call counter, when adapter 14 is in its telephone-answering mode of operation, an incoming telephone call is answered, the pre-recorded announcement message is played back, and then the tape is advanced to the next available portion upon which an incoming message can be recorded.

In the foregoing discussion, it has been assumed that the completion of a telephone call is detected by the voice timer associated with the record routine. That is, when the program remains in the loop from START to the record routine, the absence of voice for more than 15 seconds represents the completion of the telephone call. If, however, while the program is in this loop, the CPC signal is produced in response to the "hanging up" of the calling party, the program jumps from the record routine loop to the disconnect routine, described above. It is recalled that, in this disconnect routine, the telephone line is released, the call counter is incremented, the cue flag is set and the cue tone signal is generated and recorded. The program then remains in the cue tone routine loop until the cue tone signal is completed. Then, the rewind flag is set, and the rewind operation is carried out. The program then remains in the rewind routine loop until the beginning of the tape is reached, at which time the EOT signal is present. When the EOT signal is present, that is, when the beginning of the tape has been reached, the program branches and, since the dictation unit is not in its record mode but is in its rewind mode, sets the stop flag and then returns to START. The program then continues through the warning tone flag register, and, since the dictation unit is in its telephone mode, a cassette is present and the stop flag is set, now branches to reset all flags, reset the tape length counter, and enter the power-off quiescent condition mode, all as discussed above.

If, during a record routine, the supply of tape is exhausted, the program advances, step-by-step, until it reaches the inquiry as to whether the EOT signal is present. If the EOT signal is present, and the dictation unit is in its record mode, the EOT tone generator is enabled and the EOT flag is set in the warning tone flag register. The program then returns to START and proceeds through the warning tone flag register to exit to the EOT routine, shown in FIG. 3C. The program now remains in the EOT routine loop whereby the EOT tone signal is generated and the EOT pulse generator generates successive pulses. When six pulses have been generated by the EOT pulse generator, the stop flag is set and the stop mode is initiated. The program then returns to START and the EOT pulse generator continues to generate pulses. The program remains in the EOT routine loop until ten EOT pulses have been generated. At that time, the program branches to the disconnect routine, shown in FIG. 3C. Accordingly, the telephone line is released, the call counter is incremented (provided the call flag had been set during the record routine), and then, since the EOT flag had been set, the program branches to set the rewind flag, initiate the rewind operation and return to START.

Now, as before, the program remains in the rewind routine loop until the beginning of the tape is reached, at which time the stop flag is set, all flags except the EOT flag are reset, the tape length counter is reset and the apparatus is disposed in its power-off quiescent condition.

It should be appreciated that the EOT flag differs from the EOT tone flag, the latter being set in the warning tone flag register for the duration of the EOT tone. Thus, when the EOT signal is produced during the record mode, as discussed above, this EOT flag remains set, even though the EOT tone flag in the warning tone flag register is reset at the conclusion of the EOT tone.

With the setting of the EOT flag, the program cycles from START through the warning tone register, and since the dictation unit is in its telephone mode, a cassette is present, the stop flag is not set, an EOT input signal is not present, the rewind flag is not set, a cue tone is not in progress, the CPC signal is not present, the record flag is not set, the go-ahead tone flag is not set, the fast forward flag is not set, and the play flag is not set, the program reaches the inquiry as to whether the EOT flag is set. The setting of this flag returns the program to its START, and resumes this loop. It is seen that, since the EOT flag is set, the program cannot reach the ring routine and, therefore, adapter 14 does not respond to any subsequent incoming ringing signals.

Instead of reaching the end-of-tape during a message-recording operation, let it be assumed that while the message is being recorded, the tape is advanced to its end zone. The presence of the end zone signal has no effect upon the program until, ultimately, the disconnect routine is carried out in response to the completion of the telephone call, as by sensing the presence of a CPC signal or by sensing the absence of voice signals for more than 15 seconds. In this disconnect routine, the line is released, the call counter is incremented, and, since the EOT signal had not been produced but the end zone signal had, the EOT flag is set. The program then advances, replying in the negative to the inquiries as to whether the dictation unit is in its record mode or its stop mode, and replying in the affirmative that adapter 14 is in its telephone-answering mode. Then, the farthest advance counter is updated, the rewind flag is set to initiate the rewind operation, and the program returns to START. It should be appreciated that in the present example, the EOT flag is set but the EOT tone flag is not set. Hence, the program advances from START through the warning tone flag register. Then, since the dictation unit is in its telephone mode, a cassette is present, the stop flag is not set, an EOT input signal is not present, but the rewind flag is set, the program remains in the rewind routine loop. At the completion of the rewind routine, the tape has reached its beginning such that the EOT input signal is present. The program then advances from START, through the warning tone flag register, and since the dictation unit is in its telephone mode, a cassette is present, the stop flag is not set, but the EOT signal is present, continues to advance to set the stop flag and return to START. The program now advances, once again through the warning tone flag register, to reply in the affirmative to the inquiries as to whether the dictation unit is in its telephone mode, whether a cassette is present and whether the stop flag is set. The program then branches to reset all flags except the EOT flag which had been set in response to the detected end zone signal. The tape length counter is reset and the apparatus is disposed in its power-off quiescent mode. However, since the EOT flag remains set, the program, in its quiescent mode, cycles from START through the warning tone flag register, and through successive inquiries until the inquiry as to whether the EOT flag is set. The program then returns to START and remains in this loop. Consequently, since the ring routine is not reached, an incoming ringing signal is not detected and an incoming telephone call is not answered.

The foregoing description has assumed that telephone-answering mode has been selected. Let it be assumed that the remote-dictation mode has been chosen. In that event, the program cycles through its quiescent loop awaiting an incoming telephone call, this loop extending from START to the ring routine. When an incoming telephone call is detected and the ring routine is completed, the telephone line is seized and, since the telephone-answering mode has not been selected, the go-ahead warning tone flag is set in the warning tone flag register. The program then returns to START and exits from the warning tone flag register, through successive inquiries, until the inquiry regarding the setting of the go-ahead tone flag is reached. The program then remains in this loop until the completion of the go-ahead tone, whereat the program exits from the warning tone flag register to inquire whether the no-voice flag is set. Since the apparatus merely is responding to an incoming ringing signal, the no-voice flag is not set and the record flag is set. The program then jumps to the record routine, discussed above.

At the completion of an incoming telephone call, whether in response to the CPC signal or the absence of voice signals for more than 15 seconds, the program ultimately jumps to the disconnect routine, shown in FIG. 3C. It is recalled that, in this disconnect routine, the one signal is generated and recorded. Upon completing the cue signal, the inquiry is made as to whether adapter 14 is in its telephone-answering mode. In the discussions above, it has been assumed that the answer to this inquiry is in the affirmative. In the present example, since the adapter is not in its telepone-answering mode, all flags are reset, except the EOT flag. The tape length counter is reset and the apparatus is disposed in its power-off quiescent condition, awaiting receipt of the next incoming telephone call.

Thus, it is appreciated that, when adapter 14 is in its remote-dictation mode, the magnetic tape is not rewound after an incoming telephone message is recorded; a pre-recorded announcement message is not played back in response to the answering of an incoming telephone call, and a fast forward operation is not carried out following the playback of an announcement message in order to reach the next available recording portion of the magnetic tape. Apart from these differences, the program operates in substantially the same way for a telephone-answering mode and for a remote-dictation mode. Specifically, the cue tone, disconnect and EOT routines are substantially identical.

In the event that telephone selector switch TEL is deactuated while telephone line 16 is seized, the program proceeds from START, through the warning tone flag register, to exit in response to the inquiry that the dictation unit now is not in its telephone mode but that the telephone line is seized to generate the interrupt tone generator and to release the telephone line. A relatively small loop (not shown) then is established from START, through the warning tone flag register, and, since the dictation unit is not in the telephone mode and the telephone line is not seized, the program returns to START.

If a cassette is not loaded into cassette compartment 20, the program inquires as to whether the telephone line has been seized. If not, all flags are reset, except the EOT flag, the tape length counter is reset, and the apparatus is disposed in its power-off quiescent condition. However, if the telephone line had been seized and a cassette is not present, the interrupt tone generator is actuated and then the apparatus is disposed in its power-off quiescent condition.

It should be readily appreciated that the flow chart shown and described with reference to FIGS. 3A-3C performs substantially the same functions as the logic circuit illustrated in FIGS. 2A and 2B. This program can be readily implemented by those of ordinary skill in the art, and the illustrated flow chart, together with the foregoing description thereof, can be used to program a conventional processor, such as a microprocessor. It also should be appreciated that the illustrated flow chart represents a simplification of the actual program which can be used. Various so-called "housekeeping" steps as well as other steps which relate to particular functions not specifically needed for a complete understanding of the present invention have been omitted.

While the present invention has been particularly shown and described with reference to two specific embodiments, it should be readily appreciated by those of ordinary skill in the art that various changes and modifications in form and details may be made without departing from the spirit of the invention. Such changes and modifications may be made to the logic circuit shown in FIGS. 2A and 2B, or the program represented by the flow chart of FIGS. 3A-3C. For example, in ascertaining when the record medium has been advanced to the next available recording portion thereon, rather than detecting when the tape length count is equal to the farthest advance count, recorded cue signals can be counted until the cue signal count is equal to the call count. This condition occurs when the record medium arrives at the next available recording portion thereon. Also, separate "telephone-answering" and "remote dictation" selector switches may be provided to condition the apparatus either for a telephone-answering mode or a remote dictation mode of operation. It is intended that the appended claims be interpreted as including all such changes and modifications.

What is claimed is:

1. Apparatus for operating a dictation unit, having a movable record medium upon which dictated information normally is recorded, as a telephone-answering device wherein an announce message is recorded at a predetermined portion of said record medium; said apparatus comprising switch means selectively operable to condition said dictation unit to operate as a telephone-answering device; means for connecting said dictation unit to a telephone line; activate means operable when said dictation unit is conditioned to operate as a telephone-answering device to respond to an incoming ringing signal on said telephone line for activating said movable record medium to advance at a playback speed so as to transmit said announce message over said telephone line and, at the conclusion of said announce message, to selectively advance said record medium at a relatively fast speed to the next available recording portion thereon to record an incoming telephone call message; and rewind means operable at the completion of each incoming telephone call to return said record medium to the beginning of said announce message.

2. The apparatus of claim 1 wherein said activate means comprises call counting means for counting the number of incoming telephone call messages that have been recorded on said record medium; advance means operable at the conclusion of said announce message to advance said record medium until said recorded telephone call messages have been advanced; and record means for conditioning said dictation unit to record the next incoming message on said record medium following that portion thereof which has been advanced.

3. The apparatus of claim 2 wherein said call counting means comprises voice detecting means for detecting voice signals received on said telephone line, representing the occurrence of an incoming message, to produce a call indicating signal; means for sensing the completion of an incoming telephone call; and a call counter whose count is incremented by each said call indicating signal at the completion of each incoming telephone call.

4. The apparatus of claim 3 wherein said means for sensing the completion of an incoming telephone call comprises no-voice detecting means for detecting the termination of said voice signals to produce a no-voice indicating signal, said no-voice indicating signal enabling said counter to be incremented.

5. The apparatus of claim 4 wherein said means for sensing the completion of an incoming telephone call further comprises hang-up detecting means for detecting when a calling party terminates said telephone call to produce an end-of-call indicating signal, said end-of-call indicating signal enabling said counter to be incremented.

6. The apparatus of claim 5 wherein said means for sensing the completion of an incoming telephone call further comprises end-of-medium detecting means for detecting when said record medium has been exhausted during the recording of an incoming message thereon to produce an end-of-medium indicating signal, said end-of-medium indicating signal enabling said counter to be incremented.

7. The apparatus of claim 3 further comprising cue signal generating means operable at the completion of each incoming telephone call to generate a cue signal, said cue signal being recorded on said record medium.

8. The apparatus of claim 7 wherein said advance means comprises counter means for producing a count representing the amount of said record medium that is being advanced; farthest advance means for storing a count representing the amount of said record medium upon which messages have been recorded; and comparing means for comparing the count of said counter means to the count of said farthest advance means to halt the advance of said record medium when said counts are equal.

9. The apparatus of claim 3 wherein said record means comprises go-ahead signal generating means actuable to generate a go-ahead signal to apprise a calling party to transmit his message; means for actuating said go-ahead signal generating means at the conclusion of said announce message; means for terminating said go-ahead signal either within a predetermined time if the count of said call counter is equal to zero or at the halting of the advance of said record medium; and a record circuit, energized if said go-ahead signal is generated, to enable said dictation unit to record an incoming message on said record medium.

10. The apparatus of claim 3 further comprising means for sensing that, at the completion of an incoming telephone call, less than a predetermined amount of record medium is available for recording the next incoming message; and means for inhibiting said activate means from responding to an incoming ringing signal if less than said predetermined amount of record medium is available for recording.

11. The apparatus of claim 1 further comprising means for sensing when said record medium has been returned to the beginning of said announce message; and reset means responsive to said sensing means for resetting said apparatus to a quiescent condition awaiting the next incoming ringing signal.

12. Apparatus for use with a dictation unit having a record medium bi-directionally movable between a supply reel and a take-up reel, said dictation unit being connectable to a telephone line, said apparatus comprising selector means having a first state for operating said dictation unit as a telephone-answering machine and a second state for operating said dictation unit to record remote dictation transmitted thereto via said telephone line; means for selectively recording an announcement message on a first portion of said record medium to be transmitted from said dictation unit over said telephone line when said dictation unit operates as a telephone-answering machine; line seizure means responsive to an incoming ringing signal for seizing said telephone line regardless of the state of said selector means; playback means for playing back said announcement message from said first portion of said record medium following the seizure of said telephone line if said selector means exhibits said first state; recording means operative at the completion of said announcement message when said selector means exhibits said first state and operative in response to said seizure of said telephone line when said selector means exhibits said second state to advance said record medium from said supply reel to said take-up reel and then record a message received from said telephone line on the next sequentially available portion of said record medium; rewind means for returning said record medium to the beginning of said announcement message following the completion of said received message if said selector means exhibits said first state; and reset means for releasing said telephone line and for placing said dictation unit in a quiescent condition after said record medium is returned to said beginning of said announcement message or, if said selector means exhibits said second state, after the completion of said received message.

13. The apparatus of claim 12 wherein said recording means includes go-ahead signal generating means for transmitting a go-ahead signal over said telephone line to apprise a calling party to commence his message for recording, said go-ahead signal generating means being operative following the completion of said announcement message if said selector means exhibits said first state and said go-ahead signal generating means being operative in response to the seizure of said telephone line if said selector means exhibits said second state.

14. The apparatus of claim 12 further comprising call completion means for sensing the completion of a telephone call; means for terminating the operation of said recording means following the completion of said telephone call; and means for inhibiting the operation of said rewind means if said selector means exhibits said second state.

15. The apparatus of claim 14 wherein said call completion means comprises no-voice detecting means for sensing the absence of voice signals received on said telephone line for at least a predetermined time to produce a call completion signal representing the completion of said telephone call.

16. The apparatus of claim 15 wherein said call completion means further comprises hang-up detecting means for detecting when said telephone line is released by the calling party to produce said call completion signal.

17. The apparatus of claim 16 wherein said means for terminating the operation of said recording means includes cue signal generating means for generating a cue signal of predetermined duration for recording if said call completion signal is produced; and disable means for disabling said recording means at the conclusion of said cue signal.

18. The apparatus of claim 17 wherein said rewind means is actuated at the conclusion of said cue signal if said selector means exhibits said first state.

19. The apparatus of claim 16 wherein said call completion means further comprises end-of-medium detecting means for detecting when less than a predetermined amount of record medium is available for recording a received message and to operate said means for terminating the operation of said recording means.

20. The apparatus of claim 19 further comprising means for inhibiting said line seizure means if said end-of-medium detecting means detects that less than a predetermined amount of record medium is available for recording a received message.

21. The apparatus of claim 16 further comprising call counting means whose count represents the number of incoming telephone messages which have been recorded.

22. The apparatus of claim 21 wherein said call counting means inclues increment means for inrementing said count following the completion of said received message.

23. The apparatus of claim 21 wherein said recording means includes cue signal generating means for generating a cue signal following said completion of said received message, said cue signal being recorded on said record medium at the conclusion of said recorded message.

24. The apparatus of claim 23 further comprising advance means operative at the completion of said announcement message for advancing said record medium, counting means for producing a count representing the quantity of record medium that has been advanced past said recording means; farthest advance means for storing the count attained by said counting means at the conclusion of the last-generated cue signal; and comparator means for comparing the count of said counting means to the count of said farthest advance means to halt the advance of said record medium when said counts are equal and to actuate said recording means.

25. The apparatus of claim 24 including means for inhibiting said advance means if the count of said call counting means is zero.

26. The apparatus of claim 24 further comprising signal generating means for generating a warning signal while said record medium is being advanced to apprise the calling party to commence his message at the termination of said warning signal.

27. The apparatus of claim 21 further comprising display means for displaying the number of incoming telephone messages which have been recorded on said record medium.

* * * * *